United States Patent
Saito

(10) Patent No.: US 8,918,900 B2
(45) Date of Patent: Dec. 23, 2014

(54) SMART CARD FOR PASSPORT, ELECTRONIC PASSPORT, AND METHOD, SYSTEM, AND APPARATUS FOR AUTHENTICATING PERSON HOLDING SMART CARD OR ELECTRONIC PASSPORT

(75) Inventor: Tamio Saito, San Francisco, CA (US)

(73) Assignee: IVI Holdings Ltd., Boulder, CO (US)

( * ) Notice: Subject to any disclaimer, the term of this patent is extended or adjusted under 35 U.S.C. 154(b) by 0 days.

(21) Appl. No.: 10/832,781

(22) Filed: Apr. 26, 2004

(65) Prior Publication Data

US 2005/0240778 A1   Oct. 27, 2005

(51) Int. Cl.
G06F 21/00   (2013.01)
G06K 19/073   (2006.01)
G06K 19/07   (2006.01)

(52) U.S. Cl.
CPC ...... G06K 19/07354 (2013.01); G06K 19/0723 (2013.01)
USPC .................................. 726/28; 726/9; 713/186

(58) Field of Classification Search
CPC ..................... G06K 19/07354; G06K 19/0723
USPC ........................... 713/182, 185, 186; 726/2–9
See application file for complete search history.

(56) References Cited

U.S. PATENT DOCUMENTS

| | | | |
|---|---|---|---|
| 3,383,657 A | 5/1968 | Claassen et al. | |
| 4,222,516 A | 9/1980 | Badet et al. | 235/492 |
| 4,246,568 A | 1/1981 | Peterson | 340/146.3 |
| 4,253,086 A | 2/1981 | Szwarcbier | 340/146.3 |
| 4,353,056 A | 10/1982 | Tsikos | 340/146.3 |
| 4,582,985 A | 4/1986 | Lofberg | 235/380 |
| 4,586,441 A | 5/1986 | Zekich | 109/8 |
| 4,712,103 A | 12/1987 | Gotanda | 340/825.31 |
| 4,773,098 A | 9/1988 | Scott | 382/21 |
| 4,837,568 A | 6/1989 | Snaper | 340/572 |

(Continued)

FOREIGN PATENT DOCUMENTS

| | | |
|---|---|---|
| DE | 3706466 | 9/1988 |
| DE | 19618144 | 4/1997 |

(Continued)

OTHER PUBLICATIONS

Junko Yoshida. Electronic Engineering Times. Manhasset: Nov. 11, 2002. , Iss. 1244; p. 4, 1 pgs.*

(Continued)

*Primary Examiner* — Joseph P Hirl
*Assistant Examiner* — John B King
(74) *Attorney, Agent, or Firm* — Marsh Fischmann & Breyfogle LLP; Daniel J. Sherwinter

(57) ABSTRACT

A smart card authenticates a cardholder. The smart card includes a substrate, a sensor module, a wireless transceiver module, and a power circuit. The sensor module includes (a) a biometric sensor adapted to detect biometric information from a person's body, (b) a processor unit adapted to authenticate the person in response to the detected biometric information and generate an authentication signal representing an authentication result, and (c) a memory adapted to store biometric information of a specific individual associated with the smart card. The wireless transceiver module transmits signals received from the processor unit and receives a wirelessly-transmitted power signal. The power circuit generates at least one supply voltage from the received power signal and provides the supply voltage to the sensor module. An electronic passport is embedded with the smart card, and a terminal module is used for wirelessly transmitting power to and receiving signals from the electronic passport.

86 Claims, 15 Drawing Sheets

(56) References Cited

U.S. PATENT DOCUMENTS

| | | | |
|---|---|---|---|
| 4,910,393 A | 3/1990 | Gercekci et al. | 235/380 |
| 4,926,479 A | 5/1990 | Goldwasser et al. | 380/23 |
| 4,983,036 A | 1/1991 | Froelich | 356/71 |
| 4,993,068 A | 2/1991 | Piosenka et al. | 380/23 |
| 5,053,608 A | 10/1991 | Senanayake | 235/380 |
| 5,055,658 A | 10/1991 | Cockburn | 235/382 |
| 5,180,901 A | 1/1993 | Hiramatsu | 235/380 |
| 5,268,963 A | 12/1993 | Monroe et al. | 380/23 |
| 5,280,527 A | 1/1994 | Gullman et al. | 380/23 |
| 5,577,120 A | 11/1996 | Penzias | 380/23 |
| 5,585,787 A | 12/1996 | Wallerstein | 340/825.34 |
| 5,590,199 A | 12/1996 | Krajewski, Jr. et al. | 380/25 |
| 5,623,552 A | 4/1997 | Lane | 382/124 |
| 5,677,955 A | 10/1997 | Doggett et al. | 380/24 |
| 5,719,950 A * | 2/1998 | Osten et al. | 382/115 |
| 5,721,781 A | 2/1998 | Deo et al. | 380/25 |
| 5,754,675 A | 5/1998 | Valadier | 382/115 |
| 5,815,252 A | 9/1998 | Price-Francis | 356/71 |
| 5,825,880 A | 10/1998 | Sudia et al. | 380/21 |
| 5,844,218 A | 12/1998 | Kawan et al. | 235/380 |
| 5,845,481 A * | 12/1998 | Briesch et al. | 60/776 |
| 5,867,802 A | 2/1999 | Borza | 701/35 |
| 5,907,627 A | 5/1999 | Borza | 382/124 |
| 5,952,641 A | 9/1999 | Korshun | 235/382 |
| 5,978,495 A | 11/1999 | Thomopoulos et al. | 382/124 |
| 5,995,630 A | 11/1999 | Borza | 380/54 |
| 5,999,637 A | 12/1999 | Toyoda et al. | 382/124 |
| 6,094,589 A | 7/2000 | Schmitt | 600/407 |
| 6,108,636 A | 8/2000 | Yap et al. | 705/5 |
| 6,219,439 B1 | 4/2001 | Burger | 382/115 |
| 6,256,690 B1 | 7/2001 | Carper | |
| 6,320,975 B1 | 11/2001 | Vieweg | 382/124 |
| 6,325,285 B1 | 12/2001 | Baratelli | 235/380 |
| 6,335,688 B1 | 1/2002 | Sweatte | 340/573.1 |
| 6,338,435 B1 | 1/2002 | Carper | |
| 6,356,738 B1 * | 3/2002 | Schneider et al. | 455/41.2 |
| 6,360,953 B1 | 3/2002 | Lin et al. | 235/492 |
| 6,385,729 B1 | 5/2002 | DiGiorgio et al. | 713/201 |
| 6,390,374 B1 | 5/2002 | Carper et al. | |
| 6,439,464 B1 | 8/2002 | Fruhauf et al. | 235/492 |
| 6,441,482 B1 | 8/2002 | Foster | 257/724 |
| 6,456,980 B1 | 9/2002 | Powell | 705/14 |
| 6,466,126 B2 * | 10/2002 | Collins et al. | 340/333 |
| 6,480,935 B1 | 11/2002 | Carper et al. | |
| 6,539,101 B1 | 3/2003 | Black | 382/124 |
| 6,547,130 B1 * | 4/2003 | Shen | 235/380 |
| 6,581,712 B1 | 6/2003 | Nathans | 180/287 |
| 6,853,087 B2 | 2/2005 | Neuhaus et al. | 257/778 |
| 7,278,025 B2 | 10/2007 | Saito et al. | |
| 2001/0033220 A1 | 10/2001 | Stone et al. | 340/5.52 |
| 2001/0047479 A1 | 11/2001 | Bromba et al. | 713/186 |
| 2002/0007459 A1 | 1/2002 | Cassista et al. | 709/229 |
| 2002/0028003 A1 | 3/2002 | Krebs et al. | 382/115 |
| 2002/0083022 A1 | 6/2002 | Algazi | 705/408 |
| 2002/0088632 A1 | 7/2002 | Salatino et al. | 174/52.1 |
| 2002/0095587 A1 | 7/2002 | Doyle et al. | 713/186 |
| 2002/0100802 A1 | 8/2002 | Sehr | 235/384 |
| 2002/0118096 A1 | 8/2002 | Hoyos et al. | 340/5.52 |
| 2003/0085286 A1 | 5/2003 | Kelley et al. | 235/492 |
| 2004/0129787 A1 | 7/2004 | Saito et al. | 235/492 |
| 2004/0153656 A1 * | 8/2004 | Cluts et al. | 713/186 |

FOREIGN PATENT DOCUMENTS

| | | |
|---|---|---|
| DE | 19648767 | 6/1997 |
| EP | 0457398 | 11/1991 |
| EP | 0 923 018 | 6/1998 |
| EP | 0 864 996 | 9/1998 |
| EP | 0994439 | 4/2000 |
| EP | 1006479 | 6/2000 |
| EP | 1074949 A1 | 2/2001 |
| EP | 1326196 | 7/2003 |
| GB | 2 254 466 A | 10/1992 |
| GB | 2336005 A | 10/1999 |
| GB | 2 354 612 A | 3/2001 |
| JP | 61101886 | 5/1986 |
| JP | 3171385 | 7/1991 |
| JP | 4153896 | 5/1992 |
| WO | 9801820 | 1/1998 |
| WO | 0118740 | 3/2001 |
| WO | 0135334 A1 | 5/2001 |
| WO | 0159686 A1 | 8/2001 |
| WO | 02/01328 A2 | 1/2002 |
| WO | 2004023393 | 3/2004 |

OTHER PUBLICATIONS

Frank Rees, *"Intag's Smartcard set to Incorporate Biometrics"*, Financial Technology Insight, Aug. 1994, p. 5.

Search Report, PCT/US2005/013896 (Oct. 10, 2005).

IDsmart, LLC. Participates at 12th Annual Cards & Payments Asia Forum—Apr. 25-27, 2007, *Business Wire*, Apr. 19, 2007.

IDsmart™ SensorCard™ website http:www.id-smart.com.

Olivier, "Secure biometric credentials from IDsmart," Apr. 17, 2007, http://securityfanatics.com/info/Biometric-secure-credentials-IDsmart.

* cited by examiner

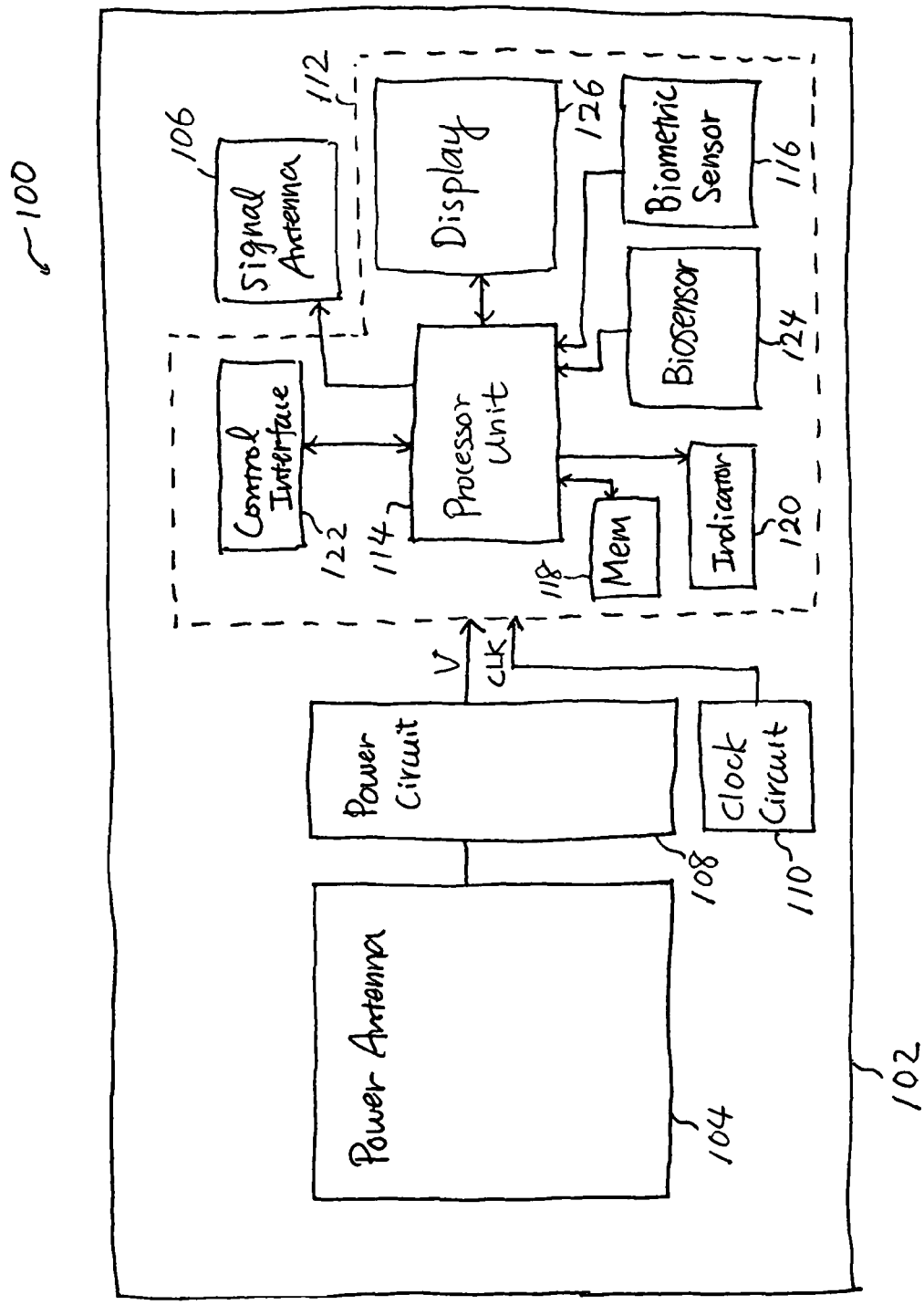

SMART CARD FOR PASSPORT, ELECTRONIC PASSPORT, AND METHOD, SYSTEM, AND APPARATUS FOR AUTHENTICATING PERSON HOLDING SMART CARD OR ELECTRONIC PASSPORT

CROSS REFERENCE TO RELATED APPLICATIONS

This application is related to a co-pending U.S. patent application Ser. No. 10/659,834 entitled "Secure Biometric Verification of Identity," filed Sep. 10, 2003 in the name of Tamio Saito, Wayne Drizin and Takashi Aida, which is puplished Jul. 8, 2004 as U.S. Patent Application Publication No. 2004/0129787, and which claims the benefit of priority from Provisional Applications 60/409,716, filed Sep. 10, 2002; 60/409,715, filed Sep. 10, 2002; 60/429,919, filed Nov. 27, 2002; 60/433,254, filed Dec. 13, 2002 and 60/484,692 filed Jul. 3, 2003.

FIELD OF THE INVENTION

The present invention relates to smart cards and electronic passports. More particularly, the present invention relates to smart cards and electronic passports including a biometric sensor, and method, system, and apparatus for authenticating a person holding the smart card or the electronic passport.

BACKGROUND OF THE INVENTION

Smart cards, which are also referred to as integrated circuit (IC) cards, typically include a microprocessor and memory on their plastic body, and are capable of data processing required for the specific purpose of the cards. The conventional smart cards are typically "credit-card" sized, and ranging from simple memory-type smart cards storing user identification information to high-end smart cards with a sophisticated computational capacity. Typically, a card reader is used to read the stored information associated with the cardholder, such as a user name, account number, personal identification number (PIN), password, and the like. The card reader may be contact type or contactless type. The authentication process is typically performed after the necessary information is read from the smart card to the card reader, using the card reader or other authentication device communicating with the card reader, such as a local or remote authentication sever.

However, such smart cards can be stolen or counterfeited, and the authentication/verification system on which the smart cards are operating can be hacked, and the conventional smart card system is still vulnerable to identity theft and fraud. The ever increasing terrorist threat as well as the explosive rise in the crime of identity theft calls for more robust and protected security systems to authenticate and verify identity of individuals using or holding smart cards. In addition, it is desirable to protect the privacy of the personal information associated with the smart card while providing such a tamper-proof security system.

BRIEF DESCRIPTION OF THE INVENTION

A smart card authenticates a cardholder. The smart card includes a substrate, a sensor module, a wireless transceiver module, and a power circuit. The sensor module includes (a) a biometric sensor adapted to detect biometric information from a person's body, (b) a processor unit adapted to authenticate the person in response to the detected biometric information and generate an authentication signal representing an authentication result, and (c) a memory adapted to store biometric information of a specific individual associated with the smart card. The wireless transceiver module transmits signals received from the processor unit and receives a wirelessly-transmitted power signal. The power circuit generates at least one supply voltage from the received power signal and provides the supply voltage to the sensor module. An electronic passport is embedded with the smart card, and a terminal module is used for wirelessly transmitting power to and receiving signals from the electronic passport or the smart card.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 10 is a block diagram schematically illustrating a smart card in accordance with one embodiment of the present invention.

DETAILED DESCRIPTION

Embodiments of the present invention are described herein in the context of a smart card for passport, an electronic passport, and a method, system, and apparatus for authenticating a person holding a smart card or electronic passport. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hard-wired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Figure 1:
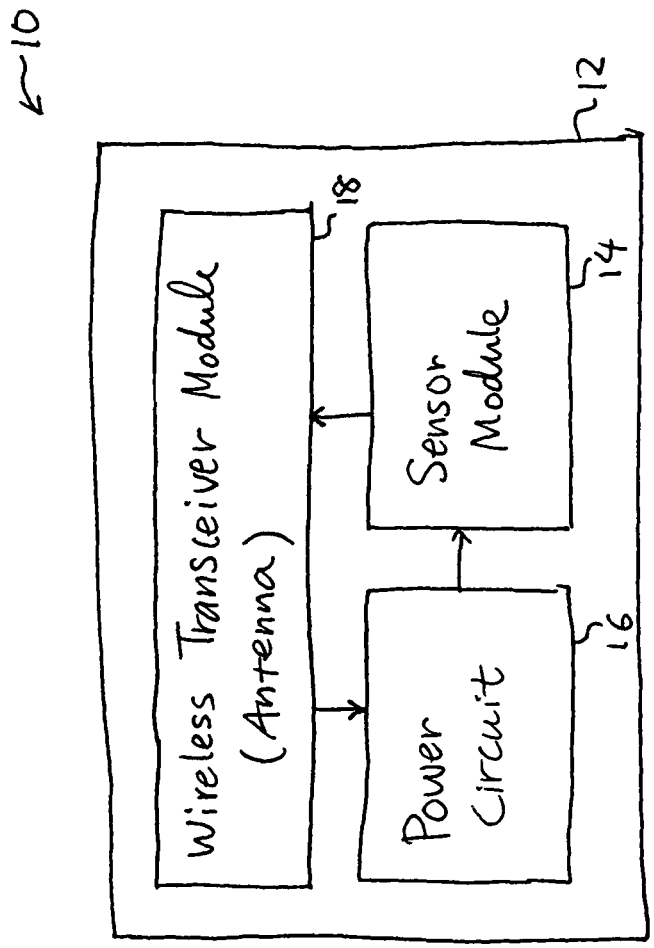
FIG. 1 is a functional block diagram schematically illustrating a smart card for authenticating a person holding the smart card in accordance with one embodiment of the present invention.

FIG. 1 schematically illustrates a smart card 10 for authenticating a person holding the smart card in accordance with one embodiment of the present invention. As shown in FIG. 1, the smart card 20 includes a substrate 12, a sensor module 14, a power circuit 16, and a wireless transceiver module 18. The sensor module 14, the power circuit 16, and the wireless transceiver module 18 are provided on the substrate 12. The sensor module 14 detects biometric information from the person's body, performs authentication for the person based on the detected biometric information, and generates an authentication signal indicating the result of the authentication, for example, positive (successfully authenticated) or negative (authentication failed). The power circuit 16 is coupled to the wireless transceiver module 18, and adapted to generate at least one supply voltage from a power signal received by the wireless transceiver module 18. The supply voltage is provided to the sensor module 14.

The wireless transceiver module 18 is coupled to the sensor module 14 and the power module 16. The wireless transceiver module 18 is adapted to transmit signals received from the sensor module 14, including the authentication signal, and also adapted to receive a wirelessly-transmitted power signal. The wireless transceiver module 18 is capable of transmitting and receiving electromagnetic waves. However, the wireless transceiver module 18 may also be implemented such that it is capable of transmitting and receiving ultrasonic waves, optical waves, infrared waves, and the like.

Figure 2:
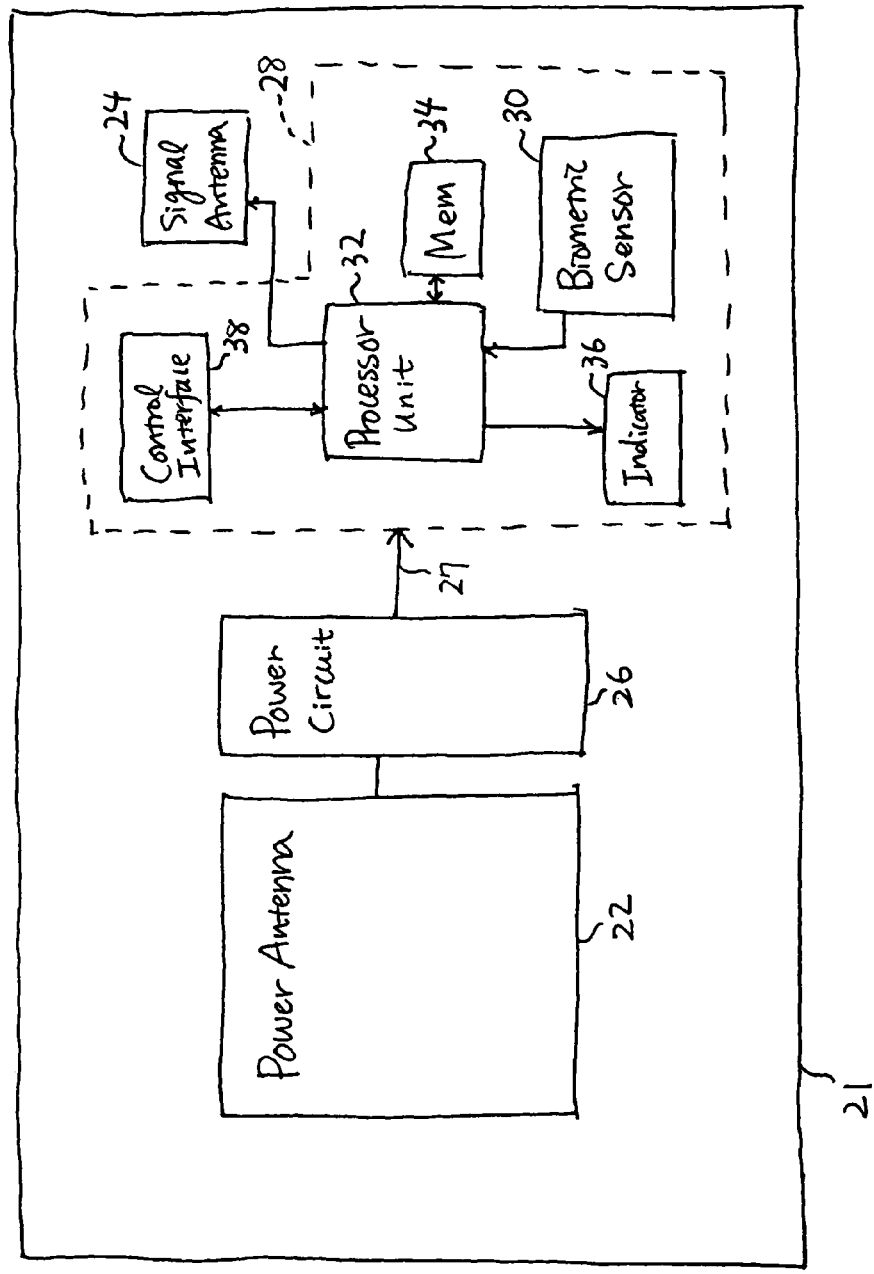
FIG. 2 is a block diagram schematically illustrating an example of the smart card in accordance with one embodiment of the present invention.

FIG. 2 schematically illustrates a smart card 20 in accordance with one embodiment of the present invention. As shown in FIG. 2, a power antenna 22, a signal antenna 24, a power circuit 26, and a sensor module 28 are provided on a substrate 21. The power antenna 22 is coupled to the power circuit 26, and the signal antenna 24 is coupled to the sensor module 28. In this example, the wireless transceiver module (shown in FIG. 1) is formed of the power antenna 22 and the signal antenna 24. The power antenna 22 and the signal antenna 24 can be the same antenna, but in this example, the signal antenna 24 is provided as a separate and independent antenna. The power antenna 22 receives the wirelessly transmitted power signal, and the power circuit 26 generates at least one supply voltage 27 from the received power signal, which is provided to the sensor module 28. The signal antenna 24 transmits signals received from the sensor module 28. In accordance with one embodiment of the present invention, the signal antenna 24 is substantially smaller than the power antenna 22. Thus, the signals transmitted from the signal antenna 24 have a substantially shorter range of transmission such that the signals are only received in a proximity of the smart card, preventing unauthorized receipt or intercept of the signals.

As shown in FIG. 2, the sensor module 28 includes a biometric sensor 30, a processor unit 32, and a memory 34. In addition, the sensor module 28 may further include an indicator 36 indicating the authentication result, and a control interface 38 which provides an external access to the processor unit 32. As shown in FIG. 2, the processor unit 32 is coupled to the biometric sensor 34 and the memory 34, and to the optional indicator 36 and the control interface 38. The processor unit 32 is adapted to authenticate a person holding the smart card in response to the biometric information detected by the biometric sensor 30, and generate an authentication signal representing the result of the authentication. The memory 34 is typically a non-volatile memory, and adapted to store the biometric information of a specific individual associated with the smart card. It should be noted that although the memory 34 is depicted in the drawings external to the processor unit 32, it may be integrated within the processor unit 32. The processor unit 32 also includes a volatile memory such as a random access memory (RAM) to perform authentication, execute instructions and/or process data. In addition, the processor unit 32 may encrypt signals before their wirelessly transmission.

Figure 3:
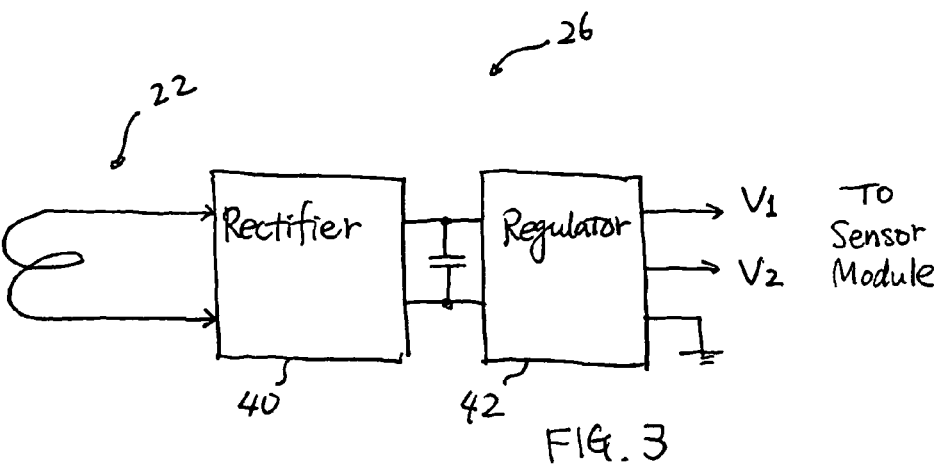
FIG. 3 is an electrical block diagram schematically illustrating a power circuit in the smart card in accordance with one embodiment of the present invention.
Figure 4:
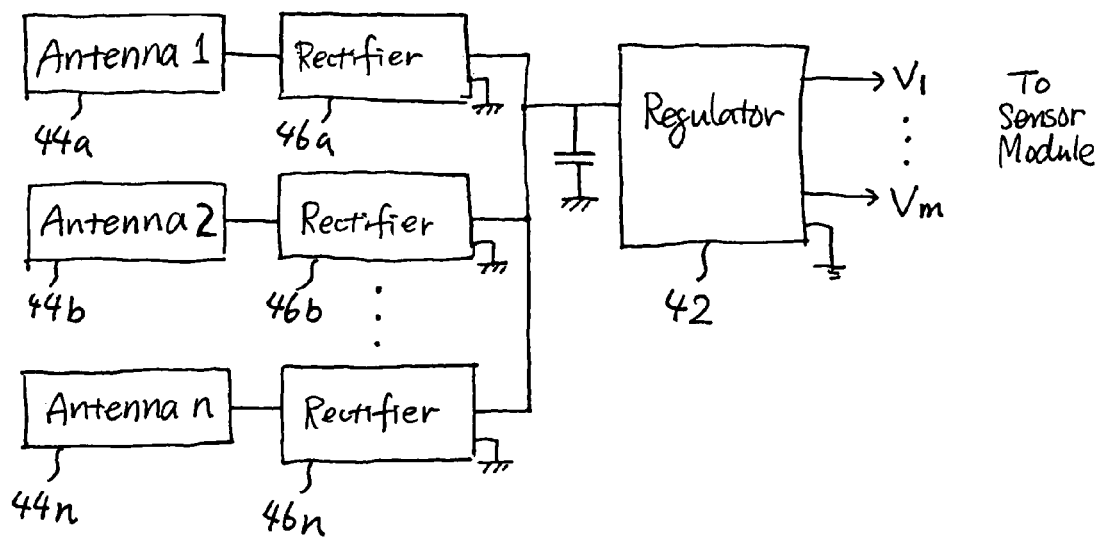
FIG. 4 is an electrical block diagram schematically illustrating an example of the power circuit in the smart card in accordance with one embodiment of the present invention.

FIGS. 3 and 4 schematically illustrate examples of the power antenna 22 and the power circuit 26 portion of the smart card in accordance with one embodiment of the present invention. As shown in FIG. 3, the power circuit 26 includes a rectifier 40 coupled to the power antenna 22, and a regulator 42 coupled to the rectifier 40. In this example, the regulator 42 generates two supply voltages V1 and V2, for example, 3.3 V and 1.8 V. In accordance with one embodiment of the present invention, as shown in FIG. 4, the wireless transceiver module may include a plurality of power antennas 44 (44a, 44b, ... 44n), and the power circuit includes a corresponding plurality of regulator circuits 46 (46a, 46b, ..., 46n) and a regulator 42. Since each set of the power antenna 44 and the rectifier 46 functions as a current source, these sets can be combined in parallel to form a larger current source to be regulated by the regulator 42.

Figure 5:
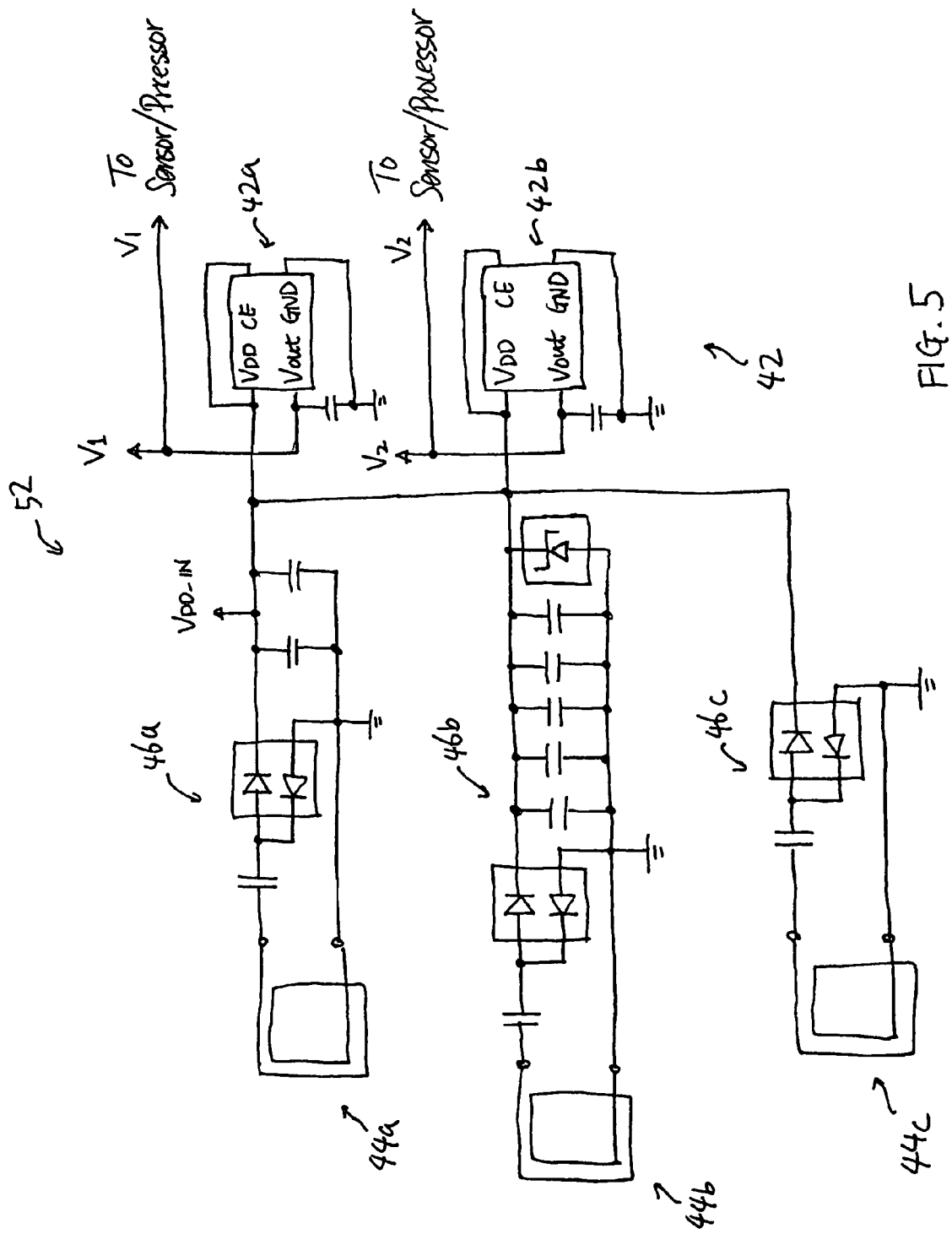
FIG. 5 is an electrical diagram schematically illustrating an example of the implementation of a power portion of the smart card in accordance with one embodiment of the present invention.

FIG. 5 schematically illustrates an example of the implementation of a power portion 52 including three power antennas 44 (44a, 44b, 44c), corresponding rectifiers 46 (46a, 46b, 46c), and a regulator 42, in accordance with one embodiment of the present invention. As shown in FIG. 5, each of the rectifiers 46 may have a different structure. For example, the rectifier 46 may be a double voltage rectifier, or may include a Schottky diode. Similarly, the regulator 42 may be a dropper regulator, a switching regulator, or a fly back regulator. The regulator 42 may have sub-parts 42a and 42b, each corresponding to a different supply voltage. For examples, the first part 42a provides a supply voltage of 3.3V, and the second part 42b provides a supply voltage of 1.8V. The number and levels of the supply voltages are not limited to two, but desired number and levels of the supply voltages may be provided depending on a specific application.

In addition, in accordance with one embodiment of the present invention, each of the plurality of power antennas 44 may have a turn number less than five (5). Preferably, each of the power antennas 44 has equal to or less than two (2) turns. Antennas with a lower turn number have a lower self inductance, allowing a higher current supply and a faster current ramp up (i.e., higher frequency response). Each of the plurality of power antennas 44 may also have approximately the same length. In addition, the power antennas may be arranged such that the inside area of the antenna coil or loop (i.e., the cross section of the magnetic field generated by the power antennas 44) is maximized. For example, the power antennas are placed along the edges of the smart card. The connection points of the power antennas may be located closely to each other. Each of the power antennas 44 may be formed as an etched or printed pattern on a plastic or paper material. Each of the power antennas 44 may have a width equal to or greater than 2 mm.

Referring back to FIG. 2, in accordance with one embodiment of the present invention, the biometric sensor 30 may be a fingerprint sensor adapted to detect fingerprint patterns. The fingerprint sensor can be of any type, but it is preferable to use sensors which can reliably detect fingerprint patterns even if being touched by a wet or dirty finger. In addition, it is preferable to use a finger print sensor which can read the surface profile of a finger, i.e., the shape and distribution of valleys or mountains of the fingerprint patterns. For example, such a fingerprint sensor may include a pressure sensor cell array or scanner, a micro electro mechanical (MEM) array or scanner, a mechanical stress array or scanner, a distance measuring cell array or scanner, a micro switch array or scanner, an elasticity measuring array or scanner, and the like, which mechanically detect the finger skin profile. However, a fingerprint sensor using a capacitance measuring call array is not preferable, since the capacitance between the finger and the cell array can vary depending on the condition of the finger, such as moisture. In addition, the fingerprint sensor may also measures a temperature profile of finger skins, for example, using an infrared detector array or scanner.

Furthermore, since the smart card and/or the passport are to be flexible in certain applications, a fingerprint sensor thereon are also preferably flexible. In such an application, the fingerprint sensor may be made using a polymer material as its insulator or substrate, or the both, for example, polyimide, polyethylene terepthalate (PET), Polypropylene (PPT), Polycarbonate, Butadiene, Epoxy, Nylon, Teflon® (polymers of tetrafluoroethylene (PTFE) or polymers of fluorinated ethylene-propylene (FEP)), and the like. However, it is not limited to the polymer material, but a thinned silicon wafer or substrate may also be used, where the wafer may be made of crystalline, polycrystalline, or amorphous silicon. For example, the thickness of the thinned silicon wafer or substrate is preferably less than 200 micron, and more preferably, less than 100 micron. The thinned silicon substrate is adapted to detect and digitize fingerprint patterns, by measuring capacitance, resistance, and the like. The thinning process may included chemical etching or gas-plasma etching. In addition, the thinned silicon waver may be backed up with a mechanical stiffener such as hard polymer, glass epoxy, copper clad glass epoxy, BT resin, copper clad BT resin, stainless steal clad or sheet, aluminum clad, or anodized aluminum clad or sheet, or the like. It should be noted that surface profile sensor and flexibility may not always be satisfied at the same time.

Referring back to FIG. 2, fingerprint templates of a specific individual associated with the smart card are stored in the memory 34. Also, the biometric sensor 30 may be an image sensor such as a charge coupled device (CCD) or metal oxide semiconductor (MOS) adapted to capture an image of the person. For example, such an image to be captured may be a face, an ear, an iris, and/or a retina of the person. However, the image is not limited to these examples, but any image of the person which can be captured as specific patterns uniquely characterizing the person may be used. In addition, the biometric sensor 30 may be a genetic information detector adapted to detect genetic information or characteristics of the person, including DNA, RNA, proteins, enzymes, blood cells, and the like. In any case, the corresponding biometric information templates (predetermined biometric patterns specifying or identifying the person) are stored in the memory 34. In accordance with one embodiment of the present invention, the biometric sensor 30 is located near an edge of the smart card. This arrangement may make it easy to place other desired or necessary items or data on the face of the smart card.

As described above, the processor unit 32 performs authentication of the person by comparing the detected biometric information with the stored biometric information, and determines if the person holding the smart card is the same person as the specific individual associated with the smart card. The processor unit 32 may also include an encryption circuit (not shown in FIG. 2) adapted to encrypt signals generated in the processor unit 32 before transmitting.

Figure 6:
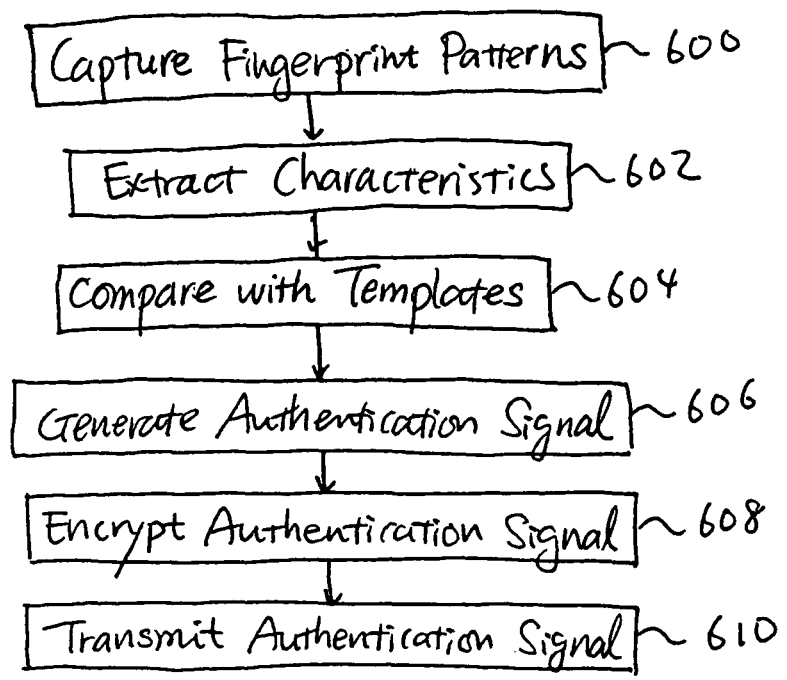
FIG. 6 is a process flow diagram schematically illustrating an example of authentication process performed in the processor unit with a fingerprint sensor.

FIG. 6 schematically illustrates an example of authentication process performed in the processor unit 32 in which fingerprints are used as the biometric information. First, fingerprint patterns of a person to be authenticated (who is holding the smart card) is captured by the fingerprint sensor (600). Then, specific characteristics to be used in the comparison are extracted from the captured finger print patterns (602). For example, minutiae, space frequency (density), and/or vector of the fingerprint patterns are extracted. These characteristics may be used alone or in combination. The extracted characteristics are compared with the corresponding templates stored in the memory (604). If the extracted characteristics are determined to match the templates, the authentication result is positive, i.e., the person is successfully authenticated. If the extracted characteristics are determined to mismatch the templates, the authentication result is negative, i.e., the person fails the authentication. An authentication signal representing the result is generated (606), encrypted (608), and then transmitted (610) via the signal antenna.

As shown in FIG. 2, the sensor module 28 may further include the indicator 36 coupled to the processor unit 32. The authentication signal may also supplied to the indicator 36, which indicates the authentication result. In accordance with one embodiment of the present invention, the indicator 36 may include at least one light emitting diode (LED). For example, the indicator 36 has two LEDs with different colors, such as red and green, and if the person is successfully authenticated, the green LED may be illuminated, and if the person fails the authentication, the red LED. In addition, by using the LEDs in combination and/or using a different illumination mode such as blinking intervals, more information can be indicated than the simple pass/fail results corresponding to the number of the LEDs.

Since a fingerprint sensor captures two-dimensional patterns from a three-dimensional surface of a finger, the detected pattern might be deformed to yield a false result although the person is a rightful owner of the smart card. Thus, by visually indicating the current status or result of the authentication, the rightful owner can adjust his/her finger pressed on the sensor such that the fingerprint patterns are correctly detected. On the other hand, the indication of unsuccessful authentication would dissuade an illegitimate holder of the smart card.

The indicator 36 is not limited to LEDs. In accordance with one embodiment of the present invention, the indicator 36 may be a liquid crystal display (LCD) adapted to display the authentication result, such as "success", "authenticated", "error", "contact authority", and other suitable messages. The LCD may also display some icons or symbols. The indicator may also be a sound player adapted to play an audio signal corresponding to the authentication result. For example, the audio signal has a different frequency, different voice message, or different melody depending on the authentication result.

As shown in FIG. 2, the sensor module 28 may further include the control interface 38 coupled to the processor unit 32, in accordance with one embodiment of the present invention. The control interface 32 is adapted to receive an external control signal so as to configure the processor unit 32. Typically, the control interface 32 is used in the initial configuration of the smart card when it is issued to a specific individual. For example, the external control signal may be used to configure the hardware and/or software of the processor unit 32, upload a program onto the processor unit 32 and/or the memory 34, upload and store the biometric information templates of the specific individual in the memory 34, and the like. An encryption key and other data for the encryption system in the processor unit 32 may also be selected and/or configured using the external control signal during the initial configuration process.

In addition, additional personal information of the specific individual, such as personal identification information and other personal information related to the user and/or purpose of the smart card may be stored in the memory 34. For example, such personal identification information includes the name, user name, password, personal identification number (PIN), date of birth, place of birth, driver's license number, and the like. A photographic image of the person may also be stored. In addition, other related information, for example, the issue date of the smart card, the expiration date of the smart card, contact information of the specific individual, and the like, can be stored, If the smart cared is used for a passport, for example, the history of travel or port entries, visa status, and the like may also stored.

The external connections to the control interface 38 may be disabled after configuring the processor unit 32 and storing the desired information in the memory 34. For example, the external access to the control interface 38 may be physically disconnected. Such physical disconnection may be permanent. Such a disconnection is preferable to prevent unauthorized access and alteration of the configuration and stored data. However, if update of the stored information is necessary or desirable, the external connection to the control interface 38 may be enabled only if the person is successfully authenticated.

Figure 7:
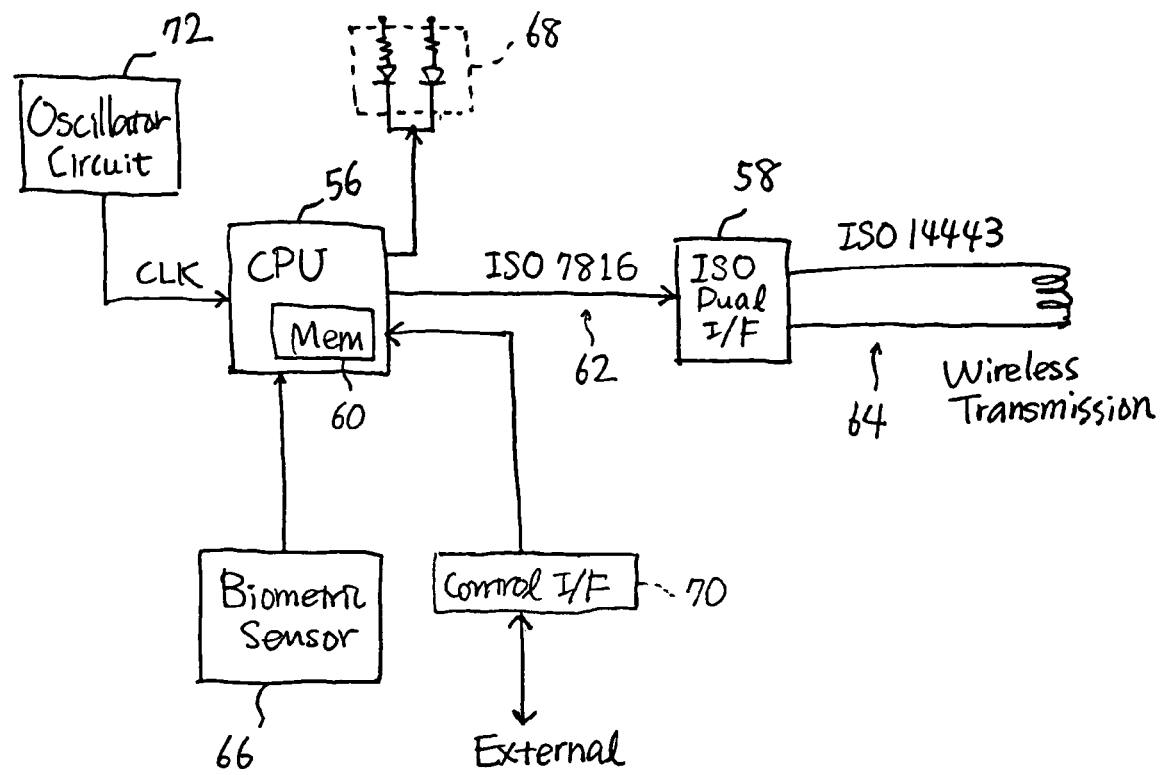
FIG. 7 is an electrical block diagram schematically illustrating an example of the sensor/processor portion of the smart card in accordance with one embodiment of the present invention.

FIG. 7 schematically illustrates an example of the sensor/processor portion in accordance with one embodiment of the present invention. In this example, the processor unit includes an authentication circuit 56 and a dual mode interface circuit 58. The authentication circuit 56 may be implemented in a central processor unit (CPU) with hardware or software, or any combination of hardware and software. That is, the authentication circuit may be realized using a general purpose CPU with specific software, an ASIC, a field programmable logic device (FPLD), or the like. The authentication CPU 56 may include a memory 60 therein and perform the above-described authentication process so as to generate the authentication signal. The biometric information of the specific individual associated with the smart card, and optional personal information of the specific individual is stored in the memory 60. The memory 60 may be external to the authentication CPU 56. The memory 60 may be a combination of a random access memory (RAM) such as static RAM (SRAM) or dynamic RAM (DRAM), and a programmable read-only memory (PROM), such as an erasable and programmable read-only memory (EPROM), an electrically erasable and programmable read-only memory (EEPROM), a flash memory (or flash PROM), and the like. The RAM is used to cash the data for a software program, program code, program instructions, and the like. The PROM is used to store the authentication program and other application programs, an encryption application and related data and files, such as encryption key, and the above-mentioned biometric information and personal information of a specific individual. Since the software programs and information stored in the PROM should not be altered or tampered, the PROM should be one-time programmable or writable. In the case of an EEPROM or flash memory, its rewritable functionality may be disabled, for example, by fusing wires or fusing drivers.

Referring back to FIG. 7, the authorization signal is sent to the dual mode interface circuit 58 via a communication bus (wire) 62. The dual mode interface circuit 58 converts the authentication signal received from authentication CPU 56 into a transmission signal suitable for wireless transmission via a signal antenna 64. That is, the dual mode interface circuit 58 is capable of both of the wired and wireless communications. Typically, however, when the wired communication is enabled on one side, the wireless communication on the other side is disabled, and vise versa. The signal antenna 64 is preferably made substantially smaller than the power antenna.

In accordance with one embodiment of the present invention, the system may be compatible with the International Organization for Standardization (ISO) standards. For example, the communication bus 62 may be compatible with ISO 7816, and the dual mode interface circuit 58 may be an ISO dual mode interface chip which is compatible with ISO 7816 (for the wired communication) and ISO 14443 (for the wireless communication). However, other ISO standards may be used depending on the application.

FIG. 7 also schematically illustrates the biometric sensor 66, the control interface 70, and an indicator (LEDs in this example) 68. The control interface 70 may be implemented using an interface complying the Joint Test Action Group (JTAG) standards, which typically provides test access port architecture. As shown in FIG. 7, the smart card may also include an oscillation circuit 72 adapted to generate a clock signal for the system on the substrate. The clock signal (CLK) is supplied directly or indirectly to all elements to operate in accordance with the clock signal, although such clock signal inputs are not depicted in FIG. 7 for simplicity. Alternatively, a clock signal may be generated from the power signal in accordance with one embodiment of the present invention. In this case, the smart card includes a clock antenna adapted to receive the power signal, and a clock circuit coupled to the clock antenna which generates the clock signal from the received power signal. For example, if the wireless transmission of the power also complies with the ISO 14443, it would have 13.56 MHz oscillation, which may be used to generate the clock signal.

Figure 8:
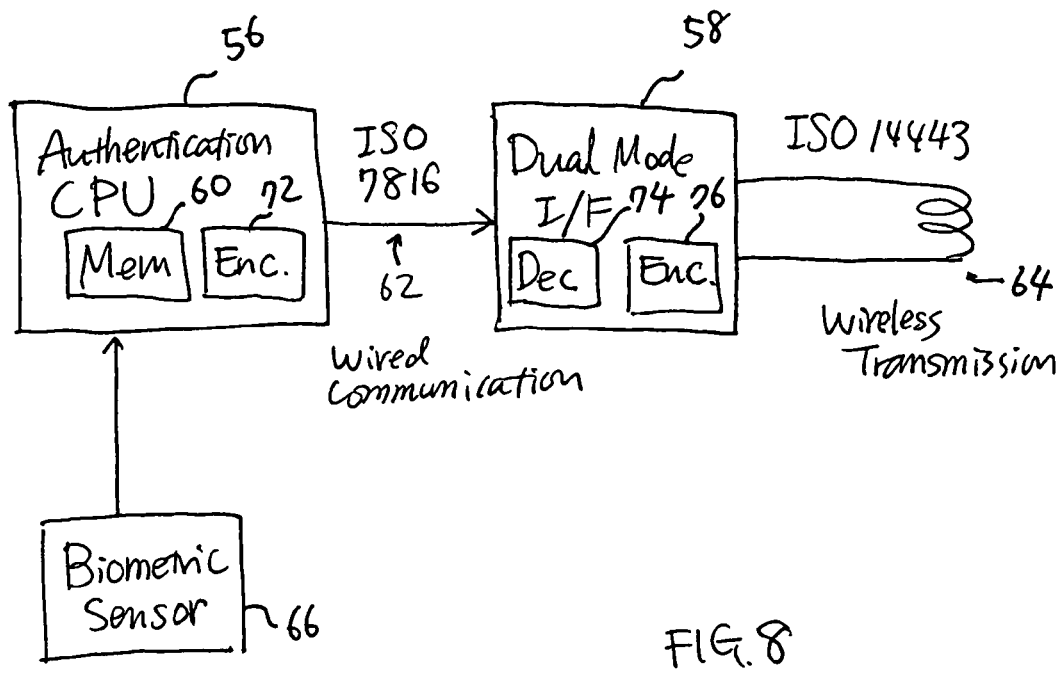
FIG. 8 is a block diagram schematically illustrating another example of implementation of the processor unit of the smart card having an encryption/decryption scheme.

FIG. 8 schematically illustrates another example of implementation of the processor unit, in which an encryption/decryption scheme is provided. The authentication CPU 56 includes an encryption circuit 72 and encrypts the authentication signal before sending to the dual mode interface circuit 58. Similarly, the dual interface circuit 58 includes a decryption circuit 74 to decrypt the encrypted signal received from the authentication CPU 56. The dual mode interface circuit 58 also includes an encryption circuit 76 adapted to encrypt the transmission signal before wirelessly transmitted via the signal antenna 64.

Figure 9A:
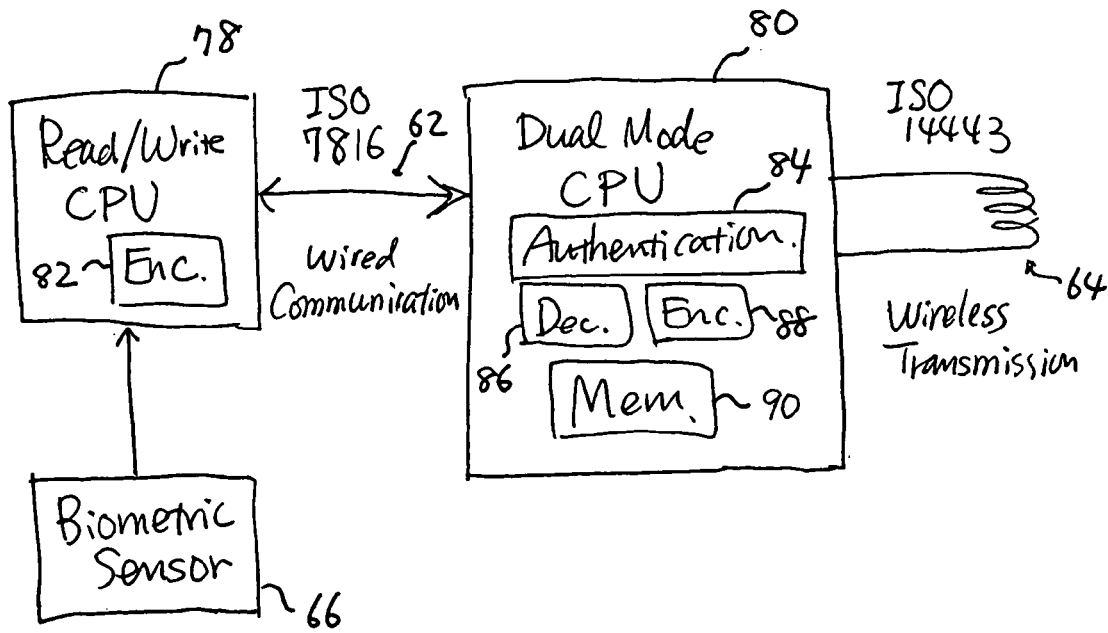
FIG. 9A is a bock diagram schematically illustrating another example of implementation of the processor unit of the smart card in accordance with one embodiment of the present invention.

FIG. 9A schematically illustrates another example of implementation of the processor unit in accordance with one embodiment of the present invention. In this example, the processor unit includes a simpler read/write CPU 78 and a dual mode CPU 80 which is capable of performing the full authentication process as well as wireless transmission with encryption. As shown in FIG. 9A, the read/write CPU 78 may include an encryption circuit 92. The read/write CPU 78 encrypts and sends the biometric information detected by the biometric sensor 66 to the dual mode CPU 80. The dual mode CPU 80 includes an authentication circuit 84 and a memory 90. The authentication circuit 84 may be implemented by software, hardware, or a combination of software and hardware. The memory 90 is adapted to store the biometric information templates of a specific individual. The dual mode CPU 80 also includes a decryption circuit 86 to decrypt the encrypted signal (detected biometric information) received from the read/write CPU 78. The dual mode CPU 80 compares the detected biometric information with the templates store in the memory 90, and generates an authentication signal representing the authentication result. The dual mode CPU 80 encrypts the authentication signal using an encryption circuit 88 before wirelessly transmitting the signal via the signal antenna 64.

Figure 9B:
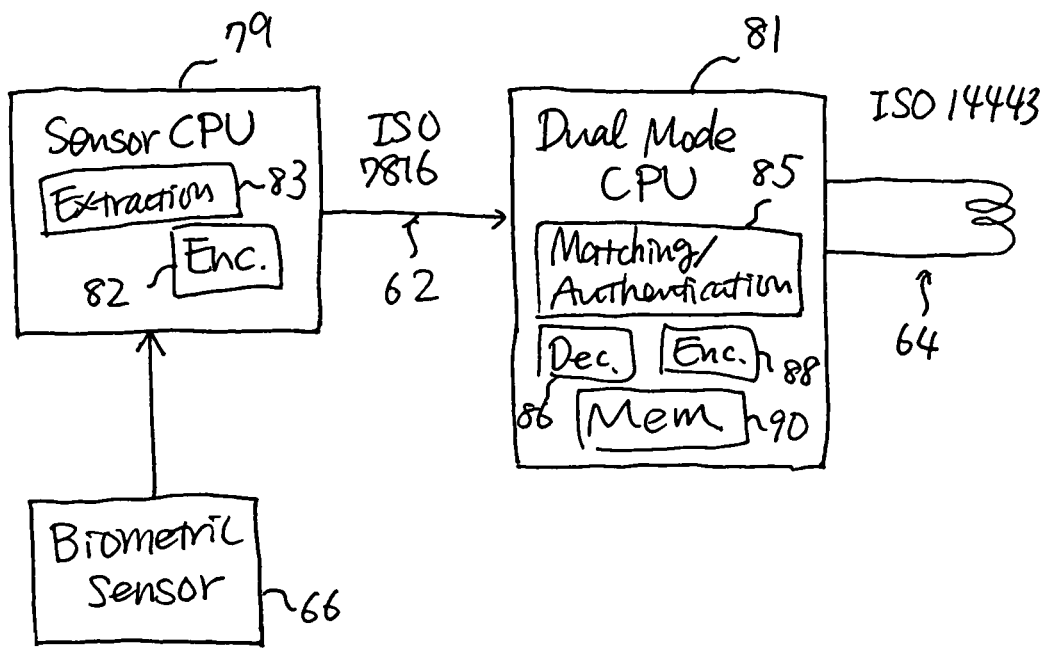
FIG. 9B is a bock diagram schematically illustrating yet another example of implementation of the processor unit of the smart card in accordance with one embodiment of the present invention.

FIG. 9B schematically illustrates yet another example of implementation of the processor unit in accordance with one embodiment of the present invention. In this example, the processor unit includes a sensor CPU 79 and a dual mode CPU 81. In this example, the sensor CPU 79 includes a extraction circuit 83 which may be software, hardware, or a combination thereof, and performs characteristics extraction from the biometric information detected by the biometric sensor 66. The extracted characteristics, such as minutiae, space frequency (density), and/or vector of the fingerprint patterns, are preferably encrypted and sent to the dual mode CPU 81. The dual mode CPU 80 includes a mating/authentication circuit 85, an encryption circuit 86, a decryption circuit 88, and a memory 90. The dual mode CPU 81 performs comparison of the extracted characteristics and the stored biometric information templates (matching with the corresponding reference characteristics), and determine if the person succeed or fail the authentication. The matching/authentication circuit 85 may be implemented by software, hardware, or a combination of software and hardware. For example, the matching/authentication circuit 85 may be implemented as an application program written in an object oriented programming language, such as a JAVA™ applet running on the JCOP smart card operating system, available from International Business Machines Corporation, Armonk, N.Y.

As described above, in accordance with one embodiment of the present invention, the additional personal information may be store in the memory 34, 60, or 90. Such additional information can be read and transmitted when the person holding the smart cared is successfully authenticated. For example, the processor unit 32, the authentication CPU 56, or the dual mode CPU 80 may further include a retrieval circuit adapted to retrieve the stored additional personal information from the memory if the detected biometric information is determined to match the stored biometric information. In this case, the processor unit 32, the authentication CPU 56, or the dual mode CPU 80 further generates a personal information signal representing the personal information of the specific individual. The personal information signal is being encrypted and transmitted via the signal antenna in the similar manner as the authentication signal described above.

FIG. 10 schematically illustrates a smart card 100 in accordance with one embodiment of the present invention. As shown in FIG. 10, the smart card 100 includes a substrate 102, a wireless transmission module having a power antenna 104 and a signal antenna 106, a power circuit 108, a clock circuit 110, and a sensor module 112. The sensor module 112 includes processor unit 114, a biometric sensor 116, a memory 118, an indicator 120, and a control circuit 122, similarly to other embodiments described above. These elements may be one of the corresponding elements in the previous embodiments, and some elements may be optional as described above. In this embodiment, the sensor module 112 further includes a biosensor 124 adapted to detect that the person holding the smart card is alive. For example, if the biometric sensor 116 is a fingerprint sensor, an unauthorized person might use a replica of the person's finger (or the body part cut from the body) to activate the smart card or utilize information stored therein. Thus, it is also important to make sure that a body from which the biometric information is to be detected is part of a live person for additional security.

In accordance with one embodiment of the present invention, the biosensor 124 may be one of, or any combination of, an oxygen detector, a carbon dioxide detector, a thermometer, a moisture sensor, an infrared sensor, a voice sensor, a brainwave sensor, an electrocardiogram sensor, an electromagnetic filed sensor, a Chi sensor, and the like. In addition, the biosensor 124 may also be an elasticity sensor adapted to detect elasticity of a member in contact therewith, or a blood flow sensor adapted to detect a blood flow in a body part in contact therewith. These biosensors may also be used alone or combined with one or more of the above described biosensors. Furthermore, the biosensor 124 may include a bio-response detector adapted to capture a reflex response of the person to a given stimulus. For example, a reflex reaction such as a change in an iris aperture in response to light intensity illuminated thereon can be used, and the biosensor 124 may include an image sensor adapted to capture an image of the iris, and a light emitter adapted to illuminate an eye of the person. If the biometric sensor 116 also includes an image sensor to capture the image of the person for biometric authentication, the biometric sensor 116 and the biosensor 124 may be integrated into one image sensor. For example, a static image may be processed for the pattern matching, and a motion (reaction) image responding to the stimulus may be processed for the "alive" test.

The processor unit 114 generates a positive authentication only if the person is successfully authenticated and also determined to be alive. The authentication result and the alive-test result may be indicated using the indicator 120 in a similar manner as described above.

In accordance with one embodiment of the present invention, the smart card 100 may further include a display 126, as shown in FIG. 10. The display 126 is coupled to the processor unit 114, and adapted to display a photographic image including the specific individual's face if the person is authenticated. For example, an application of the smart card is desirable to have a photographic image of the holder of the smart card, such a photographic image can be made available only if a person holding the smart card is successfully authenticated. This feature make counterfeiting the smart card more difficult. The righteous holder's signature may also be displayed with the photographic image. The photographic image and the optional signature to be displayed may be stored in the memory 118.

In accordance with one embodiment of the present invention, the biometric sensor 116 and the display 126 may be integrated into one element. For example, the biometric sensor 116 may be substantially transparent and laid on the display 112. In addition, since the display 126 is activated and display the image only if the holder of the smart card is successfully authenticated (including passing the live test), the display 112 also functions as an indicator.

Figure 11:
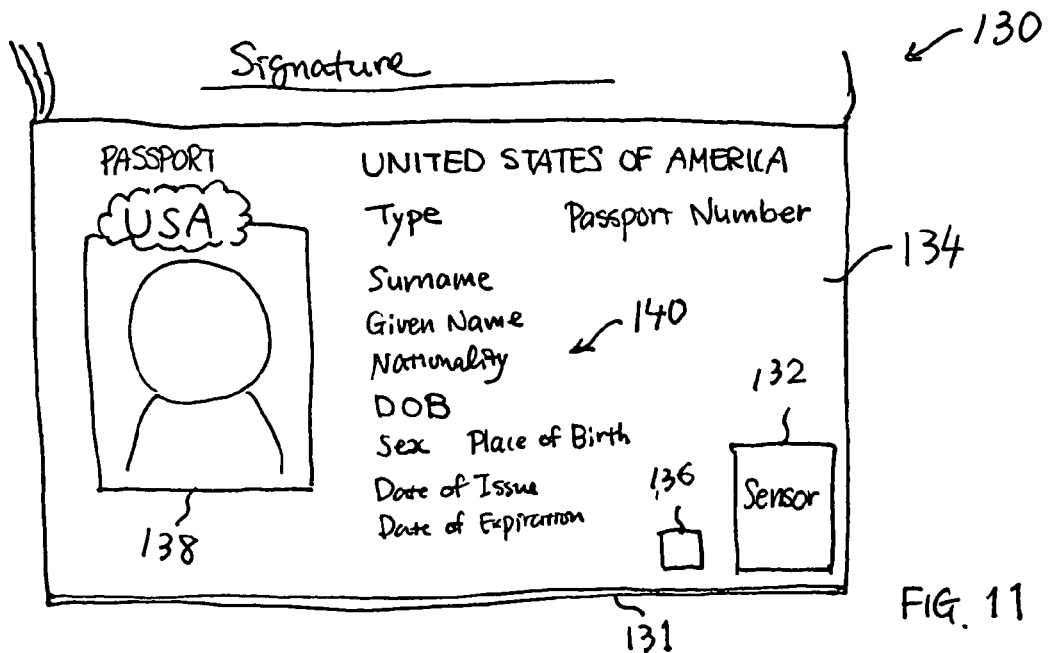
FIG. 11 is a diagram schematically illustrating an electronic passport including a smart card in accordance with one embodiment of the present invention.

In accordance with one embodiment of the present invention, the smart cards described in the above embodiments are adapted to be embedded in a passport. FIG. 11 schematically illustrates an electronic passport 130 including a smart card in accordance with one embodiment of the present invention. For example, as shown in FIG. 11, the smart card may be embedded in a front or back cover 131 of the passport 130 such that a biometric sensor 132 is visibly arranged on an inner side 134 of the front or back cover 131 where the personal identification information of the passport holder and related data are typically placed. As shown in FIG. 11, an indicator 136 may also be visibly arranged on the inner side 134 of the passport 130, especially if the indicator 136 visually indicates the authentication result, as described above. Preferably, the biometric sensor 132 is placed near an edge of the inner side 134 of the passport 130. Also preferably, the biometric sensor 132 and the optional indicator 136 are placed on the inner side 134 such that the biometric sensor 132 and the optional indicator 136 do not interfere with the passport holder's photograph 138 and other personal data 140 on the inner side 134.

Figure 12:
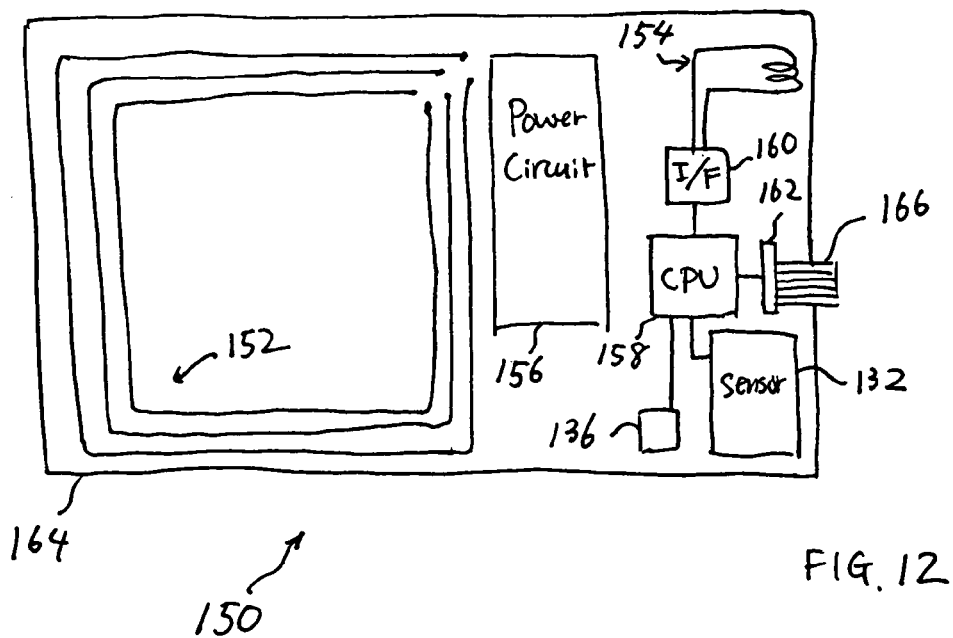
FIG. 12 is a block diagram schematically illustrating an example of a smart card embedded in the passport shown in FIG. 11.

FIG. 12 schematically illustrates an example of a smart card 150 embedded in the passport 130 shown in FIG. 11. Typically, the size of the smart card 150 is slightly smaller than that of the passport 130. Similarly to the embodiments described above, the smart card 150 includes a wireless transmission module including a power antenna 152 and a signal antenna 154, a power circuit 156, and a sensor module including the biometric sensor 132, the optional indicator 136, a processor unit having an authentication CPU 158 and a dual mode interface circuit 160, and a control interface 162. The authentication CPU 158 includes a memory (not shown) to store biometric information template and other personal data, as described above. The processor unit may be integrated into one element, or the authentication process may be performed by the dual mode CPU, as described above. In this example, the power antenna 152 includes three independent antennas having a similar length and arranged along the edges of the substrate 164 of the smart card 150.

Preferably, the signal antenna 154 is substantially smaller than the power antenna 152. For example, the signal antenna 154 (and signal antennas 24 and 64 in the above embodiments) is made small enough to be placed right upon or very close to the loop and/or trace of a terminal module antenna 194 or 199 (see FIGS. 17 and 18) which receives the wireless signals transmitted from the signal antenna 154. That is, when the smart card (or the electronic passport) is placed on the terminal module 190, the signal antenna 154 is in the close vicinity of, or preferably right on, the terminal module antenna 194 or 199 such that small load changes in the signal antenna 154 can be detected by the terminal module antenna. In addition, since the load changes are sufficiently small such that only antennas or any receiver module in the very close vicinity can detect the change, any third party cannot detected the load change for the purpose of tapping. For example, the transmitted signal can be detected at maximum 10 mm distance from the signal antenna location. That is, even on the same passport surface area, or the terminal module surface area, the transmitted signal cannot always be detected.

The control interface 162 is depicted as an external connection (lead bus) 166 is still enabled. This is typical when the electronic passport 130 is first issued to a specific individual and the smart card 150 embedded therein is under an initial configuration, in which necessary and/or desirable data, information, and/or software such as authentication program, encryption program, are uploaded and stored in a memory through the control interface 166. After such configuration and uploading, the external connection 166 may be cut off to disable access to the control interface 162.

In accordance with one embodiment of the present invention, the smart card 150 may be used as a card-type electronic passport without being embedded in a conventional paper passport. Since all information related to the passport holder and usage of the passport, which are typically printed or stamped on a conventional passport can be electronically or digitally stored in a memory provided on the smart card, the smart card itself may be implemented as an electronic passport. In this case, an additional surface layer may be provided on the substrate 164 so as to protect antennas and other electronic circuits, and also to provide a space to place visible information on the surface of the smart card. In addition, similarly to the passport 130, the biometric sensor and the optional indicate can be visibly arranged on the surface layer. This card-type electronic passport is also applicable to the following embodiments. That is, the passport or electronic passport described in the embodiments may be either a paper passport embedded with the smart card, or paperless electronic passport implemented as a smart card.

Figure 13:
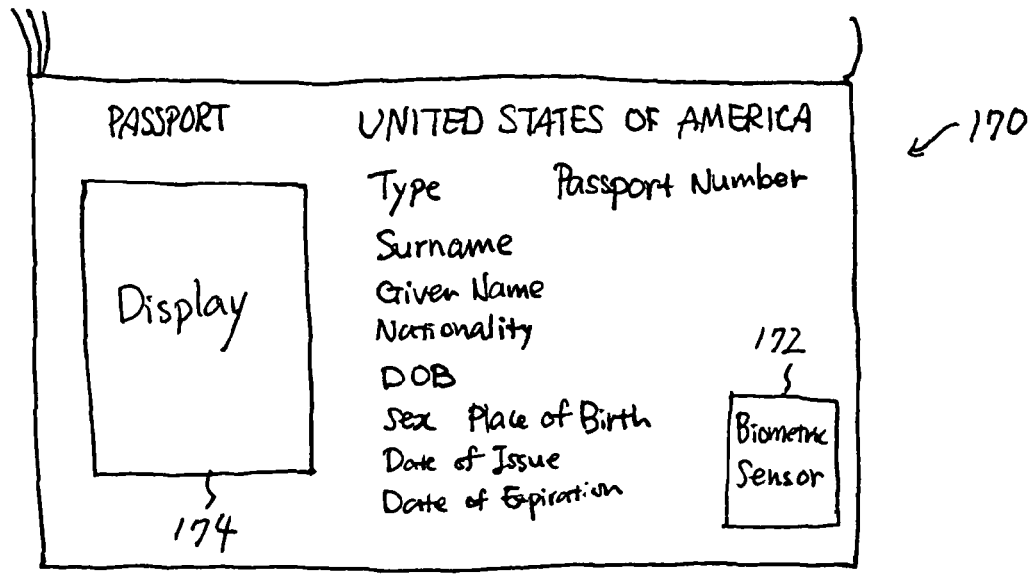
FIG. 13 is a diagram schematically illustrating an electronic passport in accordance with one embodiment of the present invention, which includes a biometric sensor and a display.

FIG. 13 schematically illustrates an electronic passport 170 in accordance with one embodiment of the present invention, in which a biometric sensor 172 is provided and also a conventional photographic face image of the passport holder is replaced with a display 174. For example, the smart card 100 (FIG. 10) described above or similar smart card may be embedded in the passport 170. It should be noted the location of the display can be rearranged in the smart card 100 such that the display 126 is placed in a proper or desirable location, for example, in the inner page of the front or back cover of the passport 170. Alternatively, the passport 170 may be a card-type electronic passport without paper pages, as described above.

Figure 14:
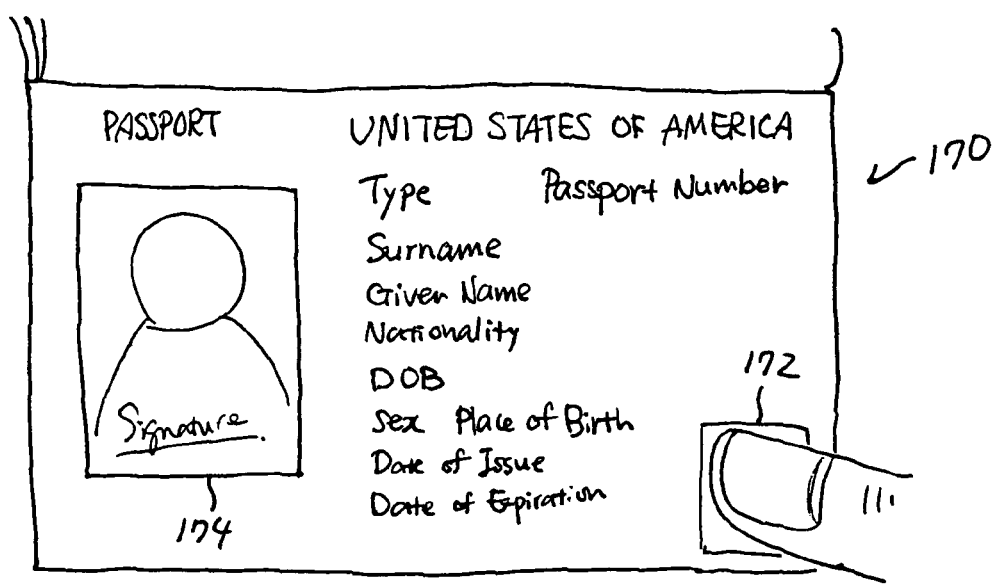
FIG. 14 is a diagram schematically illustrating an example of the electronic passport including a fingerprint sensor and a display and being authenticating a person.

FIG. 14 schematically illustrates an example of the electronic passport 170 in which the biometric sensor 172 is a fingerprint sensor. As shown in FIG. 14, when a holder of the passport is successfully authenticated when he or she places his/her finger on the fingerprint sensor 172, the display 174 displays the passport holder's photographic image and optionally his/her signature thereon. Such an imaged and optional signature may be displayed during a predetermined time period after the successful authentication, or while the finger is in contact with the fingerprint sensor 172.

Figure 15:
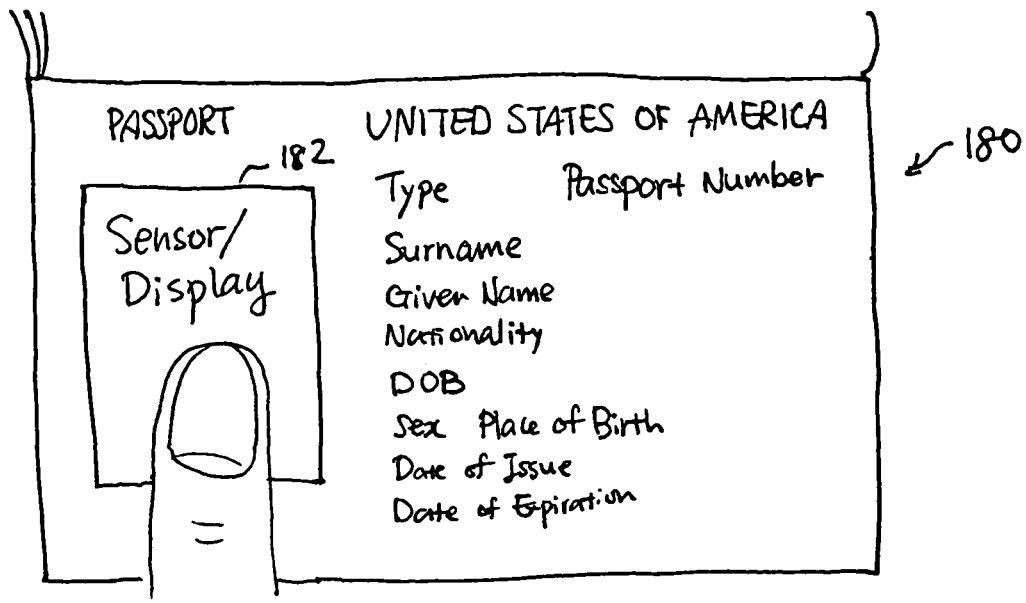
FIGS. 15 and 16 are diagrams schematically illustrating an example of an electronic passport in accordance with one embodiment of the present invention, which includes an integrated sensor/display.
Figure 16:
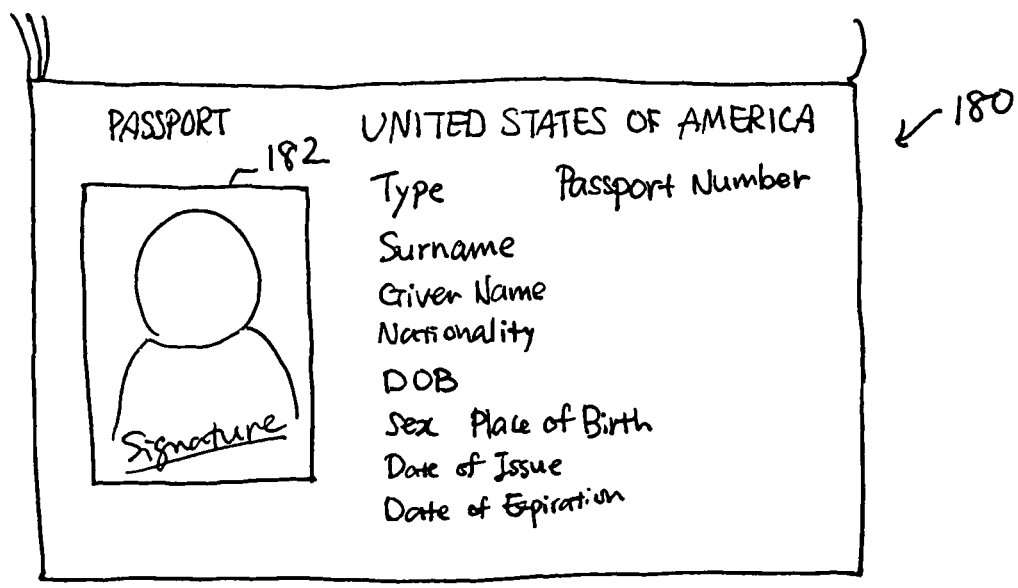

FIG. 15 schematically illustrates an example of an electronic passport 180 in accordance with one embodiment of the present invention, in which the fingerprint sensor and the display are integrated into a sensor/display 182. When a holder of the passport 180 touches the sensor/display 182, as shown in FIG. 16, detected fingerprint patterns are used for the authentication process as described above, and if the person is authenticated, the sensor/display displays the passport holder's face image and optionally his/her signature thereon. The sensor/display 182 may display the image and optional signature during a predetermined time period after the successful authentication.

Figure 17:
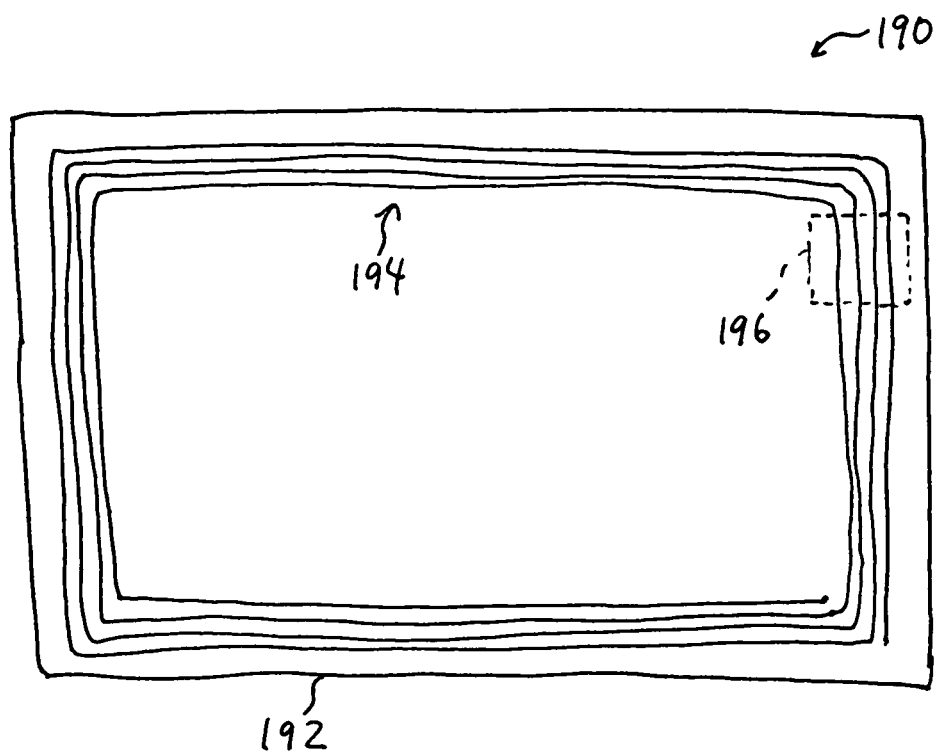
FIG. 17 is a diagram schematically illustrating a terminal module for authenticating a person holding a smart card or an electronic passport including a smart card, in accordance with one embodiment of the present invention.

FIG. 17 schematically illustrates a terminal module 190 for authenticating a person holding a smart card or an electronic passport including a smart card, in accordance with one embodiment of the present invention. The smart card or electronic passport may be any of the smart cards or electronic passports described above. The terminal module includes a support plate 192 and an antenna (terminal module antenna) 194 provided thereon. The support plate 192 is adapted to receive the smart card or electronic passport and has a size suitable to receive the smart card or the passport. The antenna 194 is adapted to transmit a power to the smart card or electronic passport. The wirelessly transmitted power is received by, for example, the wireless transceiver module 18 of the smart card 10 (FIG. 1) placed on the terminal module 190. The antenna 194 is also adapted to receive a signal transmitted from the wireless transceiver module of the smart card.

Figure 18:
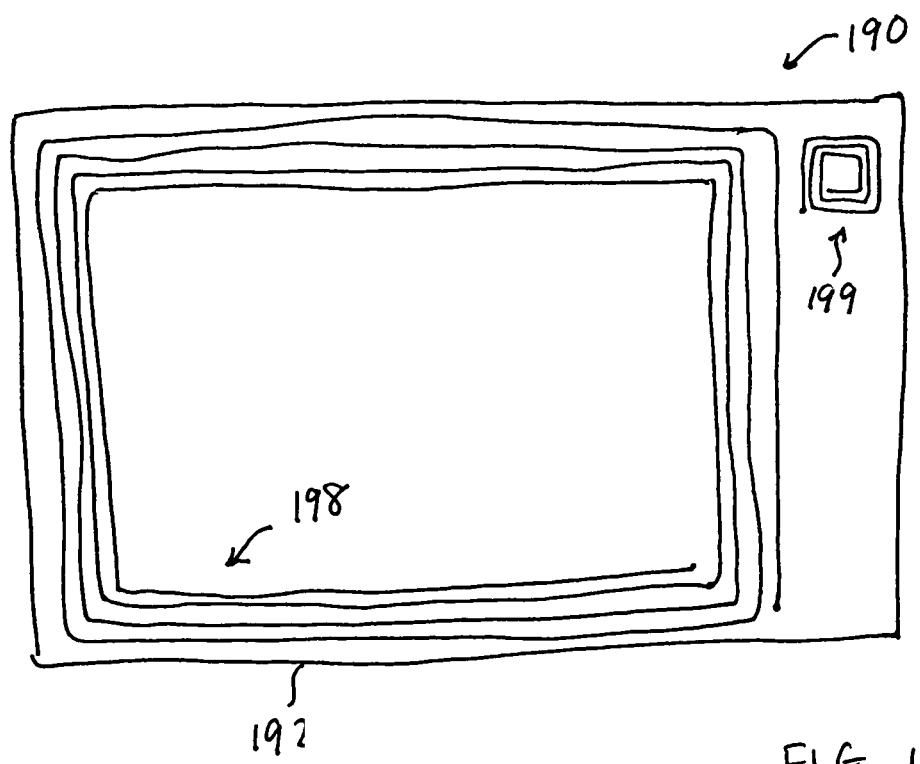
FIG. 18 is a diagram schematically illustrating an example of the terminal module in accordance with one embodiment of the present invention.

In accordance with one embodiment of the present invention, the terminal module 190 is designed to used with an electronic passport such as the electronic passport 130 embedded with the smart card 150 as described above. If the electronic passport 130 includes the power antenna 152 and the signal antenna 154, for example, the antenna 194 is adapted to wirelessly transmit the power signal to be received by the power antenna 152, and also to receive the wireless signal transmitted from the signal antenna 154. Preferably, the terminal module antenna 194 is provided on the support plate 192 such that when the electronic passport (or smart card) is placed on the support plate 192 the signal transmission antenna 154 substantially aligns on the terminal module antenna 194. Typically, the terminal module antenna 194 is substantially larger than the signal antenna 154 of the electronic passport, the signal antenna 145 will be placed on a portion 196 of the antenna 194, as shown in FIG. 17. The signal antenna 145 may be positioned just on the portion 196 or in a very close proximity thereof. Alternatively, as shown in FIG. 18, the terminal module 190 may include a power transmitting antenna 198 and a signal receiving antenna 199 separate from the power transmitting antenna 198. In this case, the signal receiving antenna 199 is placed such that the location matches that of the signal antenna 154 when the electronic passport 130 is place on the terminal module 190.

As described above, in accordance with embodiments of the present invention, the biometric information detection and the authentication process using the biometric information are performed on-board (on-card) by the smart card or the electronic passport. That is, the authentication of a cardholder/passport holder is performed without externally communicating the sensitive information such as fingerprint patterns and personal information, and such sensitive information is confined within the smart card or the electronic passport. In the case where the authentication result and related personal information is wirelessly transmitted, the transmission signal has a very short range, typically the order of millimeters, and thus is only received by the terminal module on which the smart card or electronic passport is properly placed. Accordingly, the authentication process and personal information retrieval can be done locally, and the sensitive information does not have to fly over the air or travel through the network system such as the Internet. In addition, since the full authentication can be performed locally (on-board), it is not affected by any accident or unavailability of access to an external network system or a central database.

Figure 19:
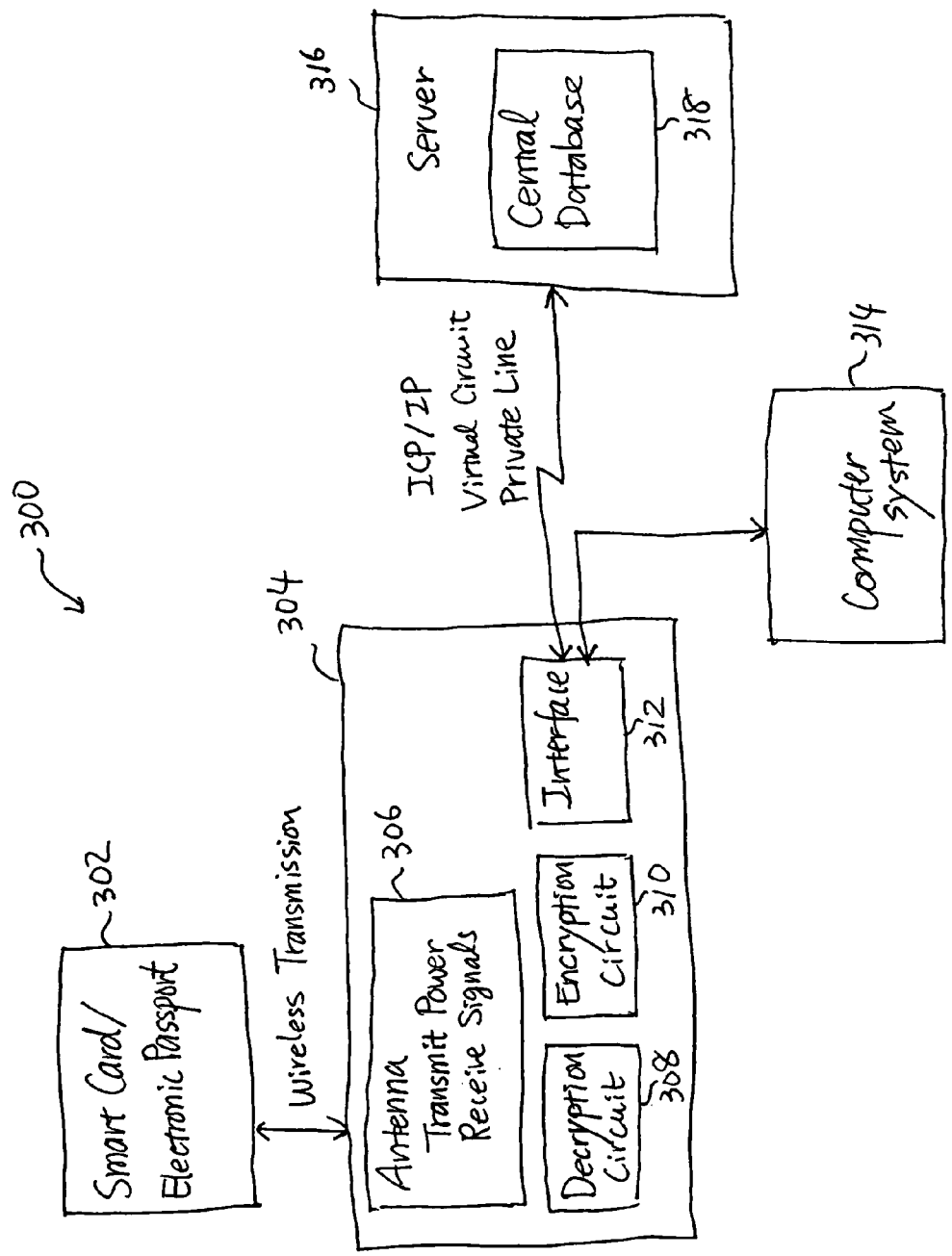
FIG. 19 is a functional block diagram schematically illustrating a system for authenticating a person holding a smart card or electronic passport in accordance with one embodiment of the present invention.

However, under certain circumstances, it may be preferable to communicate the biometric information and/or personal information of an individual with an external system beyond the terminal module. For example, in the airport, the authentication result may be monitored by the airport security personnel, and the authentication result and necessary personal information may be transmitted to a monitoring device/terminal within a local computer network. In addition, in some suspicious cases, the biometric information such as fingerprints may need to be screened against that contained in a criminal record, terrorist list database, immigration records, and the like, which are typically maintained in a government central database. For example, when the smart card or electronic passport might have been counterfeited, all of the information stored in the suspicious smart card or passport may need to be examined and compared against the corresponding information of a legitimate individual as claimed to be. Thus, the terminal module may also have a capability of communicating with outside computer system in accordance with one embodiment of the present invention FIG. 19 schematically illustrates a system 300 for authenticating a person holding a smart card or electronic passport in accordance with one embodiment of the present invention. As shown in FIG. 19, the system 300 includes a smart card/electronic passport 302, and a terminal module 304. The smart card/electronic passport may be any one of the smart cards or electronic passports described in the above embodiments. The terminal module 304 includes a terminal module antenna 306, a decryption circuit 308, an encryption circuit 310, and an interface 312. The decryption circuit 308 is adapted to decrypt signals received from the smart card/electronic passport 302, if the received signals are encrypted. The encryption circuit 312 encrypts signals transmitted from the terminal module 304. The interface 312 couples the terminal module 304 to a computer system 314, typically a local computer network. The interface 213 may also couple the terminal module with a server 316 having a central database 318. Such a connection to the server 316 may use the Transmission Control Protocol/Internet Protocol (TCP/IP), via a virtual circuit, a private line, or the like. Thus, the interface 202 may be compatible with one of the Universal Serial Bus (USB) standard, Recommended Standard 232C (RS-232C), Recommended Standard 433 (RS-433), Transmission Control Protocol/Internet Protocol (TCP/IP), and the like. The computer system 314 or the server 316 receives the authentication signal and other personal information transmitted from the terminal module 304, and performs necessary data processing, screening, comparison with the central database, and the like. In addition, the authentication result and/or personal information may be displayed to the authorized personnel.

Since the electronic passport (or the smart card therein) is powered by the power wirelessly transmitted from the terminal module, as the electronic passport leaves the power range of the terminal module, the supply voltage reduces and eventually shuts down, turning off the sensor module of the electronic passport. Thus, in accordance with one embodiment of the present invention, the sensor module of the electronic passport (smart card) is automatically initialized in response to a predetermined level of an increasing supply voltage after the supply voltage was shut down. The initialization is typically done by initializing the processor unit of the smart card. If the processor unit includes an authentication CPU and a dual mode interface circuit, for example, the authentication CPU may be initialized using the threshold voltage of the increasing supply voltage, and then the dual mode interface circuit may be initialized using a reset signal supplied from the authentication CPU.

Figure 20:
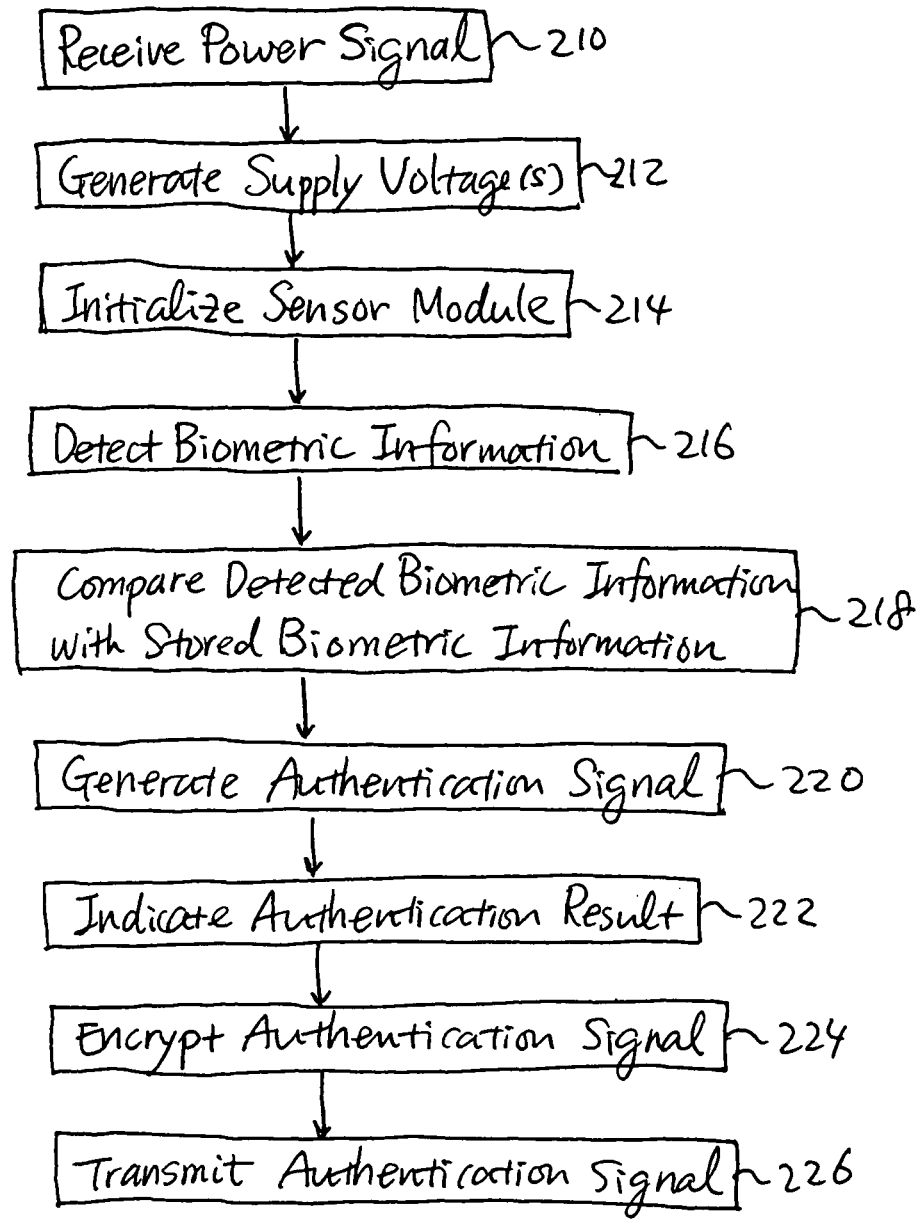
FIG. 20 is a process flow diagram schematically illustrating a method for authenticating a person holding a smart card, or an electronic passport embedded with the smart card, in accordance with one embodiment of the present invention.

FIG. 20 schematically illustrates a method for authenticating a person holding a smart card, or an electronic passport embedded with the smart card, in accordance with one embodiment of the present invention. The smart card includes a sensor module provided on a substrate of the smart card, which includes a biometric sensor, a processor unit, and a memory. The smart cared or the electronic passport may be any one of the smart cards and electronic passport described above. First, a power signal is received via a wireless transceiver module provided on the substrate (210). This may be such a situation the smart card or passport is placed on a terminal module providing the power signal. At least one supply voltage is generated from the power signal, and the supply voltage is provided to the sensor module (212) so as to power up and enable the sensor module to operate. Optionally, initialization of the sensor module may be performed during the power up period (214). Then, biometric information is detected from the person's body (216), using the biometric sensor, such as a fingerprint sensor, image sensor, or the like, as described above. The detected biometric information is compared with biometric information stored in the memory (218), and an authentication signal representing a result of the comparing is generated (220). The result of the authentication or comparison is optionally indicated using an indicator provided on the smart card (222). The authentication signal is then optionally encrypted (224) and transmitted via the wireless transceiver module (226).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A smart card for authenticating a person holding the smart card, the smart card comprising:
   a substrate;
   a sensor module provided on the substrate, the sensor module including:
      a biometric sensor that detects biometric information from the person's body and coincidentally confirms whether the person holding the smart card is alive;
      a processor unit that is coupled to the biometric sensor and authenticates the person in response to the detected biometric information and coincidentally confirming the person holding the smart card is alive, generates an authentication signal representing an authentication result, and encrypts the authentication signal; and
      a memory that is coupled to the processor unit and stores biometric information of a specific individual associated with the smart card;
   a wireless transceiver module coupled to the processor unit, the wireless transceiver module comprising:
      a signal antenna that is coupled to the processor unit and wirelessly transmits the encrypted authentication signal received from the processor unit; and
      a power antenna that is coupled to a power circuit and receives a wirelessly-transmitted power signal; and
   the power circuit that is provided on the substrate and generates at least one supply voltage from the received power signal and provides the supply voltage to the sensor module.

2. The smart card of claim 1, wherein the memory includes:
   a random access memory (RAM); and a one-time programmable read only memory (PROM).

3. The smart card of claim 2, wherein the one-time PROM comprises at least one of an erasable and programmable read-only memory (EPROM), an electrically erasable and programmable read-only memory (EEPROM), and a flash memory, wherein a rewritable function of the PROM is disabled.

4. The smart card of claim 1, the power circuit includes:
   a rectifier coupled to the power antenna; and a regulator coupled to the rectifier.

5. The smart card of claim 1, wherein the wireless transceiver module includes a plurality of power antennas, and wherein the power circuit includes a plurality of regulator circuits, each of the regulator circuits coupled to a corresponding one of the plurality of power antennas.

6. The smart card of claim 5, wherein the, plurality of power antennas are formed as an etched or printed pattern on a plastic or paper material.

7. The smart card of claim 1, wherein the wireless transceiver module is capable of transmitting and receiving electromagnetic waves, ultrasonic waves, optical waves or infrared waves.

8. The smart card of claim 1, wherein the biometric sensor includes a fingerprint sensor adapted to detect fingerprint patterns.

9. The smart card of claim 8, wherein the fingerprint sensor is adapted to read the surface profile of a finger.

10. The smart card of claim 9, wherein the fingerprint sensor is adapted to measure the surface profile of finger mechanically, the fingerprint sensor including one of: a pressure sensing cell array or scanner; a micro electro mechanical (MEM) array or scanner; a mechanical stress array or scanner; a distance measuring cell array or scanner; an elasticity measuring array or scanner; and a micro switch array or scanner.

11. The smart card of claim 9, wherein the fingerprint sensor is adapted to measure a temperature profile of a skin of a finger.

12. The smart card of claim 11, wherein the fingerprint sensor includes an infrared detector array or scanner.

13. The smart card of claim 9, wherein the fingerprint sensor includes a thinned silicon substrate adapted to detect and digitize fingerprint patterns.

14. The smart card of claim 13, wherein the thinned silicon substrate has a thickness less than about 200 microns.

15. The smart card of claim 14, wherein the thinned silicon substrate is backed up with a mechanical stiffener that includes a hard polymer.

16. The smart card of claim 8, wherein the biometric information to be stored in the memory includes fingerprint templates of the specific individual.

17. The smart card of claim 1, wherein the smart card is flexible.

18. The smart card of claim 17, wherein the biometric sensor comprising a polymer material as an insulator, a substrate, or both.

19. The smart card of claim 1, wherein the biometric sensor includes a genetic information detector adapted to detect a genetic information of the person.

20. The smart card of claim 1, wherein the biometric sensor includes an image capture device.

21. The smart card of claim 1, wherein said biosensor is adapted to sense one or more of an oxygen level, a carbon dioxide level, a temperature, a moisture level, an infrared reading, a voice, a brainwave, an electrocardiogram reading, an electromagnetic field, an enzyme level, and/or Chi.

22. The smart card of claim 1, wherein the biosensor includes at least one of: an elasticity sensor adapted to detect elasticity of a member in contact therewith; and a blood flow sensor adapted to detect a blood flow in a body part in contact therewith.

23. The smart card of claim 1, wherein the biosensor includes a bio-response detector adapted to capture a reflex response of the person to a given stimulus.

24. The smart card of claim 23, wherein the reflex response includes a change in an iris aperture in response to light intensity illuminated thereon.

25. The smart card of claim 24, wherein the biosensor includes: an image sensor adapted to capture an image of the iris; and a light emitter adapted to illuminate an eye of the person.

26. The smart card of claim 1, wherein the sensor module further includes an indicator coupled to the processor unit and adapted to indicate the authentication result.

27. The smart card of claim 1, wherein the sensor module further includes a control interface coupled to the processor unit and adapted to receive an external control signal and configure the processor unit.

28. The smart card of claim 27, wherein the control interface's connections to the external control signal are disabled after an initial configuration of the processor unit.

29. The smart card of claim 28, wherein the control interface's connections to the external control signal are permanently disabled by a physical disconnection after the initial configuration.

30. The smart card of claim 28, wherein the initial configuration includes writing the biometric information of the specific individual to the memory.

31. The smart card of claim 1, wherein the processor unit includes an encryption circuit adapted to encrypt signals generated by the processor unit.

32. The smart card of claim 1, wherein the processor unit includes an authentication circuit adapted to compare the detected biometric information with the biometric information stored in the memory, and adapted to generate the authentication signal.

33. The smart card of claim 32, wherein the authentication circuit is implemented using one or more of hardware, software, and firmware.

34. The smart card of claim 32, wherein the memory is further adapted to store personal information of the specific individual.

35. The smart card of claim 34, wherein the personal information includes at least one of: personal identification information; and personal information related to a purpose or usage of the smart card.

36. The smart card of claim 34, wherein the processor unit further includes a retrieval circuit adapted to retrieve the stored personal information from the memory if the detected biometric information is determined to match the stored biometric information.

37. The smart card of claim 36, wherein the processor unit further generates a personal information signal representing the personal information of the specific individual, the personal information signal being transmitted via the wireless transceiver module.

38. The smart card of claim 32, wherein the processor unit further includes an interface circuit coupled to the authentication circuit, the interface circuit adapted to convert a signal received from authentication unit into a signal suitable for wireless transmission.

39. The smart card of claim 1, wherein the smart card is adapted to be embedded in a passport.

40. The smart card of claim 1, wherein the smart card is a card-type electronic passport.

41. The smart card of claim 40, further comprising a card surface layer provided on the substrate, the biometric sensor being visibly arranged on the card surface layer, the card surface layer containing desired information related to the passport.

42. The smart card of claim 1, further comprising a display provided on the substrate, the display coupled to the processor unit, the display adapted to display a photographic image including the specific individual's face if the person is authenticated.

43. The smart card of claim 42, wherein the display is further adapted to display a signature of the specific individual if the person is authenticated.

44. The smart card of claim 42, wherein the display is activated by the authentication signal representing a positive result.

45. The smart card of claim 1, wherein the processor unit comprises an authentication circuit and an interface circuit, the authentication circuit configured to generate the authentication signal that represents the authentication result, the dual mode interface circuit being adapted to receive the authentication result and wirelessly transmit the authentication result.

46. The smart card of claim 1, wherein the processor unit comprises an authentication circuit and an interface circuit, the authentication circuit including an encryption circuit configured to encrypt the authentication signal for provision to the interface circuit.

47. The smart card of claim 1, wherein the processor unit comprises an authentication circuit and an interface circuit, the interface being configured to receive an encrypted signal, representing a first encrypted version of the authentication result, from the authentication circuit, decrypt the encrypted signal, and provide a second encrypted version of the authentication result for wireless transmission.

48. The smart card of claim 1, wherein the processor includes a first processor and a second processor, the first processor configured to receive detected biometric information and encrypt the detected biometric information, the second processor configured to receive the encrypted biometric information, decrypt the encrypted biometric information, and generate the authentication signal representing the authentication result.

49. The smart card of claim 1, wherein the processor unit includes a first processor configured to extract data from the detected biometric information and provide an encrypted form of the extracted data for a second processor that is configured to transmit a representation of the extracted data.

50. A method for authenticating a person holding a smart card, the smart card including a sensor module provided on a substrate of the smart card, the sensor module including a biometric sensor, a processor unit, and a memory, the method comprising:
receiving a power signal via a power antenna of a wireless transceiver module provided on the substrate;
generating at least one supply voltage from the power signal and supplying the supply voltage to the sensor module;
detecting, using the biometric sensor, biometric information from the person's body;
comparing the detected biometric information and biometric information stored in the memory;
confirming, using the biometric sensor and coincidentally with the detecting, that the person holding the smart card is alive;
generating an authentication signal representing a result of the comparing and that the person holding the smart card is confirmed to be alive;
encrypting the authentication signal; and
transmitting, wirelessly, the encrypted authentication signal via a signal antenna of the wireless transceiver module.

51. The method of claim 50, wherein the sensor module further includes an indicator, the method further comprising indicating the result of the comparing by the indicator.

52. The method of claim 51, wherein the indicating includes indicating the result using at least one light emitting diode (LED) or a liquid crystal display (LCD).

53. The method of claim 50, wherein the detecting includes detecting fingerprint patterns of the person.

54. The method of claim 53, wherein the comparing includes comparing the fingerprint patterns with fingerprint templates stored in the memory.

55. The method of claim 50, wherein the detecting includes capturing an image of the person, wherein the image includes at least one of a face, an ear, an iris, and a retina.

56. The method of claim 50, wherein the detecting includes detecting at least one of oxygen, carbon dioxide, a temperature, moisture, and an infrared radiation.

57. The method of claim 50, wherein the detecting includes at least one of: detecting elasticity of a member in contact with the biosensor; detecting a blood flow in a body part in contact with the biosensor.

58. The method of claim 50, wherein the detecting includes capturing a reflex response of the person to a given stimulus.

59. The method of claim 58, wherein the reflex response includes a change in an iris aperture in response to light intensity illuminated thereon.

60. The method of claim 59, further comprising illuminating an eye of the person.

61. The method of claim 50, further comprising:
supplying an external control signal via a control interface so as to configure the sensor module;
supplying, via the control interface, biometric information of a specific individual associated with the smart card, and storing the biometric information in the memory; and
disabling connections to the control interface after the supplying the external control and the storing the biometric information in the memory.

62. The method of claim 61, wherein the disabling includes physically disconnecting external access to the control interface.

63. The method of claim 61, further comprising storing in the memory personal information of the specific individual.

64. The method of claim 63, wherein the personal information includes at least one of: personal identification information; and personal information related to a purpose or usage of the smart card.

65. The method of claim 63, further comprising:
retrieving the stored personal information from the memory if the detected biometric information is determined to match the biometric information template;
generating a personal information signal representing the retrieved personal information; and
transmitting the personal information signal via the wireless transceiver module.

66. The method of claim 50, wherein the smart card is embedded in a passport, and the specific individual associated with the smart card is a person to which the passport is issued.

67. The method of claim 50, further comprising initializing the sensor module in response to a predetermined level of an increasing supply voltage after the supply voltage was shut down.

68. The method of claim 50, wherein encrypting the authentication signal comprises:
converting the authentication signal into a transmission signal for wireless transmission; and
encrypting the transmission signal.

69. An apparatus for authenticating a person holding a passport, the apparatus comprising:
means for storing biometric information of a specific individual associated with the passport;
means for detecting biometric information from the person's body and coincidentally confirming whether the person is alive;
means for authenticating the person in response to the detected biometric information and coincidentally confirming the person holding the smart card is alive, for generating an authentication signal representing an authentication result, and for encrypting the authentication signal;

means for wirelessly transmitting signals received from the means for authenticating, the means being configured to transmit the encrypted authentication signal;

means for receiving a wirelessly-transmitted power signal; and means for generating from the received power signal a supply voltage sufficient to power the means for detecting, the means for authenticating, and the means for wirelessly transmitting.

70. The apparatus of claim 69, wherein the means for authenticating includes means for comparing the detected biometric information with the stored biometric information.

71. The apparatus of claim 69, wherein the sensor module further includes means for indicating the authentication result.

72. The apparatus of claim 69, wherein the means for detecting includes means for detecting fingerprint patterns of the person.

73. The apparatus of claim 72, wherein the means for authenticating includes means for comparing the fingerprint patterns with fingerprint templates stored in the means for storing.

74. The apparatus of claim 69, wherein the means for detecting includes means for capturing an image of the person, wherein the image includes at least one of a face, an ear, an iris, and a retina.

75. The apparatus of claim 69, wherein the means for detecting if the person is alive includes at least one of: means for detecting oxygen; means for detecting carbon dioxide; means for detecting a temperature; means for detecting moisture; and means for detecting an infrared radiation.

76. The apparatus of claim 69, further comprising:
means for supplying an external control signal via a control interface so as to configure the sensor module;
means for supplying, via the control interface, biometric information of a specific individual associated with the smart card, and for writing the biometric information in the means for storing; and
means for disabling connections to the control interface after supplying the external control and writing the biometric information.

77. The apparatus of claim 69, further comprising means for storing personal information of the specific individual.

78. The apparatus of claim 77, wherein the personal information includes at least one of: personal identification information; and personal information related to a purpose or usage of the smart card.

79. The apparatus of claim 77, further comprising:
means for retrieving the stored personal information if the detected biometric information is determined to match the biometric information template; and
means for generating a personal information signal representing the retrieved personal information, the personal information signal being transmitted via the means for wirelessly transmitting.

80. A system for authenticating a person holding a passport, the system comprising:
a smart card embedded in the passport, the smart card including:
a substrate;
a sensor module provided on the substrate, the sensor module including a biometric sensor that detects biometric information from the person's body and coincidentally confirms whether the person holding the smart card is alive;
a processor unit that is coupled to the biometric sensor and authenticates the person in response to the detected biometric information and coincidentally confirming the person holding the smart card is alive, generates an authentication signal representing an authentication result, and encrypts the authentication signal;
a memory that is coupled to the processor unit and stores biometric information of a specific individual associated with the smart card;
a wireless transceiver module that is coupled to the processor unit and has:
a signal antenna that is coupled to the processor unit and wirelessly transmits the encrypted authentication signal; and
a power antenna that is coupled to a power circuit and receives a wirelessly-transmitted power signal; and
the power circuit provided that is on the substrate and generates a supply voltage from the received power signal and provides a supply voltage to the sensor module; and
a terminal module, including an antenna that transmits a power signal to the smart card and receives a signal transmitted from the wireless transceiver module of the smart card.

81. The system of claim 80, wherein the signal antenna is placed on a proximity position on a loop or trace of the antenna of the terminal module when the smart card is placed on the terminal module.

82. The system of claim 80, wherein the processor unit comprises an authentication circuit and an interface circuit, the authentication circuit configured to generate the authentication signal that represents the authentication result, the dual mode interface circuit being adapted to receive the authentication result and wirelessly transmit the authentication result.

83. The system of claim 80, wherein the processor unit comprises an authentication circuit and an interface circuit, the authentication circuit including an encryption circuit configured to encrypt the authentication signal for provision to the interface circuit.

84. The system of claim 80, wherein the processor unit comprises an authentication circuit and an interface circuit, the interface being configured to receive an encrypted signal, representing an encrypted version of the authentication result, from the authentication circuit, decrypt the encrypted signal, and provide an encrypted version of the authentication result for wireless transmission.

85. The system of claim 80, wherein the processor includes a first processor and a second processor, the first processor configured to receive detected biometric information and encrypt the detected biometric information, the second processor configured to receive the encrypted biometric information, decrypt the encrypted biometric information, and generate the authentication signal representing the authentication result.

86. The system of claim 80, wherein the processor unit includes a first processor configured to extract data from the detected biometric information and provide an encrypted form of the extracted data for a second processor that is configured to transmit a representation of the extracted data.

* * * * *